US008838517B2

(12) United States Patent
Dillon et al.

(10) Patent No.: US 8,838,517 B2
(45) Date of Patent: *Sep. 16, 2014

(54) PERSONAL TASTE ASSESSMENT METHOD AND SYSTEM

(71) Applicant: Wine Ring, Inc., Syracuse, NY (US)

(72) Inventors: Stephen Dillon, New York, NY (US); Pamela Dillon, Syracuse, NY (US); Andrew Sussman, Fayetteville, NY (US)

(73) Assignee: Wine Ring, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,260

(22) Filed: Jul. 8, 2013

(65) Prior Publication Data
US 2014/0019296 A1 Jan. 16, 2014

Related U.S. Application Data

(60) Provisional application No. 61/669,329, filed on Jul. 9, 2012, provisional application No. 61/764,623, filed on Feb. 14, 2013, provisional application No. 61/781,792, filed on Mar. 14, 2013.

(51) Int. Cl.
*G06N 5/04* (2006.01)
*G06Q 30/02* (2012.01)
*G06Q 30/06* (2012.01)
*G06N 5/02* (2006.01)

(52) U.S. Cl.
CPC .............. *G06N 5/04* (2013.01); *G06Q 30/0269* (2013.01); *G06Q 30/0631* (2013.01); *G06Q 30/0282* (2013.01); *G06N 5/02* (2013.01)
USPC ......................................................... 706/46

(58) Field of Classification Search
CPC ...... G06N 5/04; G06Q 30/02; G06Q 30/0241; G06Q 30/0631
See application file for complete search history.

(56) References Cited

U.S. PATENT DOCUMENTS 5,200,909 A 4/1993 Juergens
5,990,885 A 11/1999 Gopinath
(Continued)

OTHER PUBLICATIONS

O'Connor et al., "PolyLens: A Recommender System for Groups of Users", Proceedings of the Seventh European Confernce on Computer-Supported Cooperative Work, Sep. 16-20, 2001, Bonn, Germany, pp. 199-218.

(Continued)

*Primary Examiner* — Jeffrey A. Gaffin
*Assistant Examiner* — Mikayla Chubb
(74) *Attorney, Agent, or Firm* — Fox Rothschild LLP

(57) ABSTRACT

A personal taste assessment system receives a person's ratings for various rated items, such as wines or other beverages, and it develops a preference model for the person based on the received ratings. When developing the preference model, the system accesses a database of candidate items, wherein each candidate item is associated with at least one trait value. The system retrieves from the database a value for at least one trait for each of the rated items, identifies at least one pattern of dependency between at least one of the retrieved trait values and at least one of the received ratings, and determines a preference model based on the at least one pattern of dependency. The system may use the preference model to develop a preference profile for the person, make recommendations, and/or make predictions as to items that the person and/or a group that includes the person may enjoy.

20 Claims, 12 Drawing Sheets

(56) References Cited

U.S. PATENT DOCUMENTS

| | | |
|---|---|---|
| 7,003,515 B1 | 2/2006 | Glaser et al. |
| 7,403,910 B1 | 7/2008 | Hastings et al. |
| 7,593,863 B1 | 9/2009 | Sunshine et al. |
| 7,617,127 B2 | 11/2009 | Hunt et al. |
| 7,962,482 B2 | 6/2011 | Handman et al. |
| 8,001,008 B2 | 8/2011 | Engle |
| 8,001,064 B1 | 8/2011 | Rennison |
| 8,037,080 B2 | 10/2011 | Koren |
| 2002/0111899 A1 | 8/2002 | Veltre et al. |
| 2004/0148107 A1 | 7/2004 | Piotrowski et al. |
| 2004/0181445 A1 | 9/2004 | Kolsky et al. |
| 2005/0075923 A1 | 4/2005 | Kolsky et al. |
| 2006/0259344 A1 | 11/2006 | Patel et al. |
| 2007/0150428 A1 | 6/2007 | Webb |
| 2008/0160147 A1 | 7/2008 | Tormey |
| 2009/0055139 A1 | 2/2009 | Agarwal et al. |
| 2009/0083126 A1 | 3/2009 | Koren et al. |
| 2009/0083258 A1 | 3/2009 | Koren et al. |
| 2009/0119234 A1 | 5/2009 | Pinckney et al. |
| 2009/0210246 A1 | 8/2009 | Patel et al. |
| 2009/0210321 A1 | 8/2009 | Rapp |
| 2010/0088649 A1 | 4/2010 | Kemp |
| 2010/0185933 A1 | 7/2010 | Coffman et al. |
| 2010/0250556 A1 | 9/2010 | Park et al. |
| 2010/0287033 A1 | 11/2010 | Mathur |
| 2011/0208617 A1 | 8/2011 | Weiland |
| 2012/0030060 A1 | 2/2012 | Lu et al. |
| 2012/0041969 A1 | 2/2012 | Priyadarshan et al. |
| 2012/0047105 A1 | 2/2012 | Saigal et al. |
| 2012/0226698 A1 | 9/2012 | Silvestre et al. |
| 2013/0006904 A1 | 1/2013 | Horvitz et al. |
| 2013/0080438 A1 | 3/2013 | Tompkins |

OTHER PUBLICATIONS

Xiong et al., "Application of Multivariate Adaptive Regression Splines (MARS) to the Preference Mapping of Cheese Sticks", Journal of Food Science, vol. 69, Nr. 4, 2004.

| WID | Cl | Grape | Country | Fl | Ml | B | Ac | Ol | Tl | Flavors |
|---|---|---|---|---|---|---|---|---|---|---|
| 70 | 14 | Syrah | New Zealand | ▬ | ▪ | ▬ | ▬ | ▬ | ▬ | Black, Red, Blk_Spice, Earth, Mineral, Wood |
| 83 | 14 | Pinotage | South Africa | ▬ | ▪ | ▬ | ▬ | ▬ | ▬ | Black, Earth, Microbial, Mineral, Wood |
| 50 | 3 | Cabernet Sauvignon | Chile | ▬ | | ▬ | ▬ | ▬ | ▬ | Black, Red, Chemical, Earth, Vegetal, Wood |
| 48 | 3 | Cabernet Sauvignon | USA | ▬ | | ▬ | ▬ | ▬ | ▬ | Black, Herbal, Wood |
| 49 | 3 | Cabernet Sauvignon | USA | ▬ | | ▬ | ▬ | ▬ | ▬ | Black, Earth, Floral, Wood |
| 74 | 13 | Merlot | USA | ▬ | | ▬ | ▬ | ▬ | ▬ | Black, Chemical, Herbal, Wood |
| 75 | 13 | Merlot | USA | ▬ | | ▬ | ▬ | ▬ | ▬ | Black, Chemical, Herbal, Wood |
| 68 | 13 | Shiraz | Australia | ▬ | | ▬ | ▬ | ▬ | ▬ | Black, Red, Blk_Spice, Herbal, Wood |
| 85 | 13 | Zinfandel | USA | ▬ | | ▬ | ▬ | ▬ | ▬ | Black, Red, Blk_Spice, Herbal, Wood |
| 80 | 4 | Pinot Noir | USA | ▬ | | ▬ | ▬ | ▬ | ▬ | Black, Red, Brl_Spice, Earth, Wood |
| 81 | 4 | Pinot Noir | USA | ▬ | | ▬ | ▬ | ▬ | ▬ | Black, Red, Earth, Herbal, Wood |
| 113 | 4 | Syrah | USA | ▬ | | ▬ | ▬ | ▬ | ▬ | Red, Blk_Spice, Herbal, Wood |
| 69 | 4 | Shiraz | Australia | ▬ | | ▬ | ▬ | ▬ | ▬ | Red, Blk_Spice, Herbal, Wood |
| 51 | 4 | Carménère | Chile | ▬ | | ▬ | ▬ | ▬ | ▬ | Black, Animal, Earth, Herbal, Wood |
| 86 | 4 | Malbec | Argentina | ▬ | | | ▬ | ▬ | ▬ | Black, Floral, Wood |

FIG. 7

PERSONAL TASTE ASSESSMENT METHOD AND SYSTEM

RELATED APPLICATIONS AND CLAIMS OF PRIORITY

This patent document claims priority to U.S. Provisional Patent Application Nos. 61/669,329 filed Jul. 9, 2012, 61/764,623 filed Feb. 14, 2013 and 61/781,792 filed Mar. 14, 2013, the disclosures of each of which are incorporated herein by reference in their entirety This patent document is also related to: U.S. patent application Ser. No. 13/909,401 filed Jun. 13, 2013; and U.S. patent application Ser. No. 13/935,169 filed Jul. 3, 2013. The disclosures of each related application are also incorporated herein by reference in their entirety.

BACKGROUND

This document describes methods and systems for determining the drivers of consumer preferences for items, such as beverages and other consumable items, Currently, many systems are available to recommend products to consumers. Such systems may include a consumer profile that includes data representing items that the consumer previously purchased and/or rated. While these systems use past purchase data or ratings to identify other items that the consumer may enjoy, the recommended items generally bear a direct relationship to the consumer's previously purchased or rated items. For example, in the context of wine, a system may learn that a consumer enjoyed a particular California Pinot Noir. If so, it may recommend other California Pinot Noirs, or other wines from the same vineyard as the rated wine, to the consumer.

However, current systems lack the ability to truly assess whether the user is likely to enjoy the recommended item, or do such systems have a desired level of ability to find and recommend apparently unrelated items that the consumer is likely to enjoy.

This document describes methods and systems directed to solving at least some of the problems described above, and/or additional problems.

BRIEF DESCRIPTION OF THE DRAWINGS

FIG. 7 illustrates an example of a class hierarchy.

SUMMARY

Figure 1:
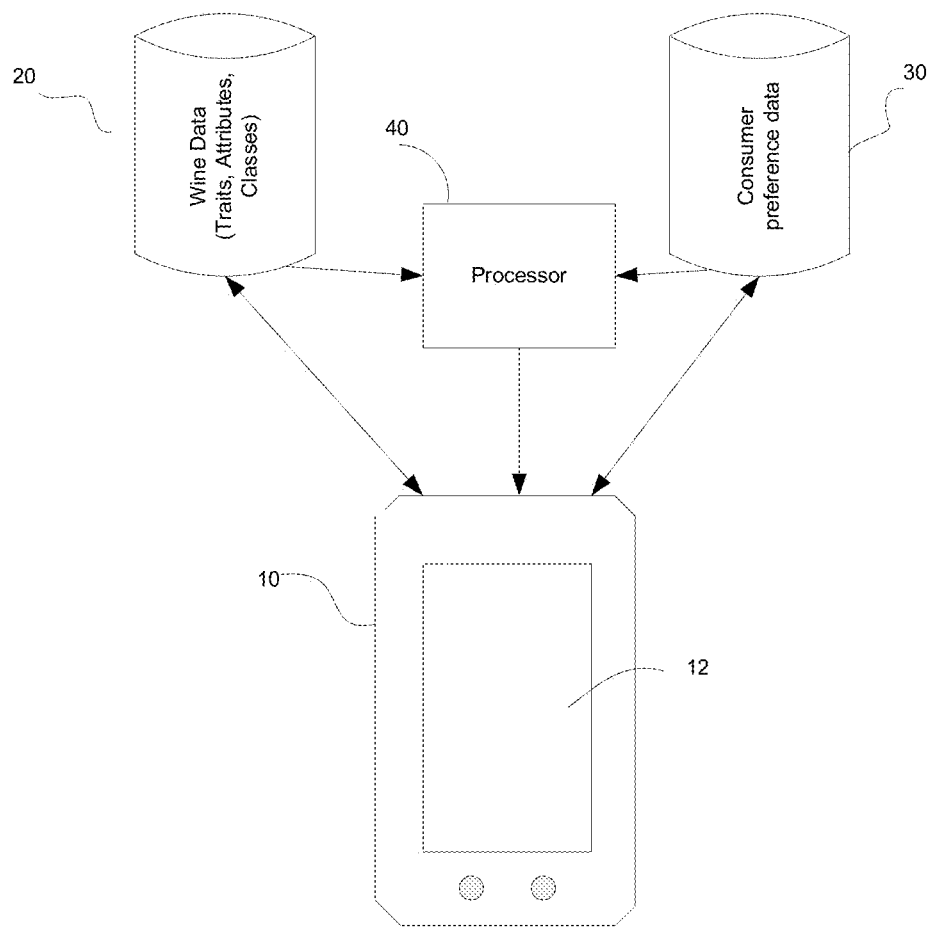
FIG. 1 is block diagram illustrating various elements of a personal taste assessment system.

In an embodiment, a system that includes one or more processors, non-transitory computer-readable memories, and programming instructions implements a method of assessing a person's personal taste. The system causes an electronic device to output a user interface through with a user may enter, and the system may receive, a rating set with a person's ratings for various rated items. The system will develop a preference model for the person based on the received ratings. When developing the preference model, the system accesses a database of candidate items, wherein each candidate item is associated with at least one trait value. The system identifies the rated items that correspond to the candidate items, and it retrieves from the database a value for at least one trait for each of the rated items. The system identifies at least one pattern of dependency between at least one of the retrieved trait values and at least one of the received ratings, and it determines a preference model based on the at least one pattern of dependency. The system may use the preference model to develop a preference profile for the person, and it may prepare a report of the preference profile.

In some embodiments, the system may receive a context for the person's experience of one or more of the rated items and also use the context to determine the preference model.

When identifying a pattern of dependency, the system may identify a polarizing or contrasting pattern of dependency. For example, the system may identify a focal contrasting pattern associated with a group of the rated items by analyzing relative differences in ratings for the group of rated items as a function of the items' traits by determining that the person's ratings for the group of rated items include a focal point of positive or negative appeal. As another example, the system may identify a polarizing preference pattern for which the person has expressed different patterns of rating for one or more trait values.

As another example, the system may identify a consistent trait for which the person's ratings exhibit a degree of dispersion such as that they are an effectively constant function—for example, if the degree of dispersion is below a threshold. In addition, the system may identify a trending trait for which there is a non-reversing upward or a non-reversing downward trend in rating values as a function of the trait values.

In some embodiments, the system may retrieve, from the database, a value for at least one attribute for each of the rated items. If so, it may identify, between a plurality of the received rating values and a plurality of the retrieved attribute values, one or more dependence patterns of the received rating values on the retrieved attribute values. It may then use the one or more dependence patterns to determine the preference model.

In some embodiments, the system may access the database to identify at least one item that exhibits characteristics that, if the candidate item is rated by the person, will improve the preference model or a preference profile for the person. If so, it may generate a suggestion that the person rate the identified candidate item.

In some embodiments, the system may generate an experience score for the preference model such that the experience score is a function of the rated items in the preference model. The function may be, for example, a function of the number of rated items in the preference model or a function of the range of possible trait values that the rated items cover. If the experience score is below a threshold, it may access the database to identify at least one item that exhibits characteristics that, if the item is rated by the person, will improve the person's preference model or a preference profile for the person. It may then generate a suggestion that the person rate the identified item.

In some embodiments, the system may identify a subset of the rated items; determine that the preference model indicates a conflict between preference indicators for one or more characteristics of the rated items in the subset; access the database to identify at least one item that exhibits characteristics that, if the item is rated by the person, will resolve the conflict; and generate a suggestion that the person rate the identified item.

In some embodiments, the system may receive identifying information about a non-rated item, and it may use the identifying information to access the database and determine whether the non-rated item is in the database. If the non-rated item is in the database, it may identify one or more characteristics of the non-rated item, and determine whether the identified characteristics of the non-rated item correspond to one or more indicators of preference in the preference model or a preference profile for the person. Based on whether the identified characteristics of the non-rated item correspond to one or more indicators of preference, the system may venerate a prediction of whether the person is likely to exhibit a preference for the non-rated item.

In some embodiments, the system also may access a second person's preference profile, determine that the second person's preference profile includes a second person preference model that is similar to the determined preference model, and add the second person's preference model to the developed preference profile. Alternatively, it may access the database to identify at least one item that the person is expected to like based on the person's preference profile, access a second person's preference profile; use the second person's preference profile to determine whether the second person is also expected to like the identified item, and if so generate a recommendation that both persons try the identified item.

In some embodiments, the system may predict whether or not a person will like a particular item by receiving identifying information for an item of interest, retrieving from the database one or more trait values and/or attribute values for the item of interest, processing the retrieved values with the person's preference profile to determine a predicted rating for the item, and outputting the predicted rating to the person.

In some embodiments, the system may receive a request for a recommendation. The request may include a pairing criterion, such as a criterion for pairing a beverage with a food. If so, the system may access the database to identify one or more items that have characteristics that satisfy the pairing criterion; select one or more of the retrieved items having characteristics that, based on the person's preference profile, the system determines that the person is expected to like; and recommend the selected items to the person.

In an alternate embodiment, a personal taste assessment system includes a database that includes attribute value for a plurality of candidate items. When the system receives a rating set that includes a person's ratings for each of a plurality of rated items, it use a processor to developing a preference model for the person based on the received ratings. The system retrieves, from the database, a value for at least one attribute for each of the rated items; identifies at least one polarizing or contrasting pattern of dependency between at least one of the retrieved attribute values and at least one of the received ratings; and determines the preference model based on the at least one polarizing or contrasting pattern of dependency.

In an alternate embodiment, a personal taste assessment system includes a database of candidate items, wherein each candidate item is associated with at least one attribute value. The system also includes one or more processors and a computer-readable memory containing programming instructions that are configured to, upon execution, cause the one or more processors to perform various functions. When performing the functions the system may retrieve, from the database, a value for at least one characteristic for each of the rated items; identify at least one polarizing or contrasting pattern of dependency between at least one of the retrieved characteristic values and at least one of the received ratings; determine a preference model based on the at least one polarizing or contrasting pattern of dependency; use the determined preference model to develop a preference profile for the person; save the preference profile to a memory; and upon receipt of a query from the person, use the preference profile to generate a recommendation for the person. The recommendation may include one or more of any of the following: (i) a predicted rating for an item of interest that is identified in the query, (i) a recommendation for one of the items that both the person and a second person that is identified in the query are expected to like, based on information from a preference profile for the second person; or (iii) a recommendation that the person rate one of the candidate items that exhibits characteristics that, if the recommended candidate item is rated by the person, will improve the preference profile for the person.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

For the purposes of this application, a "computing device" or "electronic device" refers to a computer or other machine having a processor and tangible, processor-readable memory that implement one or more operations according to one or more programming instructions. Various possible elements of a computing device are described in reference to FIG. 12.

"Electronic communication" refers to any form of electronic sharing of data and/or instructions, including physically connected or wireless communication, as well as communication that is direct or indirect via one or more networks.

In this document, the phrase "consumable item" is used to refer to any item that a consumer uses and, during use, experiences at least in part via the consumer's senses of taste, smell or touch. For example, consumable items may include food or beverage items such as wines, spirits, beers, cheeses, tobacco products and the like. Although the examples below often are described in the context of wine, other consumable items may be associated with the methods and systems described below.

Although the examples below describe the invention in the context of wine, the invention is not limited to use in connection with items that must be literally ingested by the user.

Applications of the invention may include any consumable item that includes sensor traits (and in some embodiments, items that the consumer may taste, smell, or touch optionally in addition to see and/or hear) for which whose immediate perception is the source of utility to the user and/or forms the basis for the user's preferences for the items, e.g. perfumes, colognes and clothing.

The current state of the art preference profiles, such as those that may be associated with recommendation systems, describe or identify the items that are appealing to a user, i.e. "what" the user prefers. Various methods and systems in this document may create a preference profile that describes the configurations of a user's preference. i.e. "how" the user prefers. This type of preference profile provides the basis for a more complete description of a user's preferences and a more general approach to identifying items for them to sample.

The system takes in a user's ratings of consumable items whose properties are known to the system, along with optional rating context data, to generate their preference profile and use it to recommend or suggest items for the user to try, predict the appeal of untried items or report a readable profile.

While preference profiles are almost always described in the context of recommendation systems, such systems need not generate a preference profile or furnish one to the user in order to properly function. This is because, in the current state of art, it is not necessary to generate an explicit preference profile in order to predict items that may be appealing to the user. In some current systems the user's preferences are implicitly captured by mathematical functions and parameters whose identity and values offer no direct insight to a user's preferences. In cases where a profile can be obtained it typically comes as a list of the items that are known to have or are predicted to have a particular appeal to the user. This is because the current state of the art works by learning how to associate item names or other item identifiers with their ratings. Thus, when they are available, preference profiles tell us only "what" items a user prefers.

The discussion below addresses at least some of these issues by furnishing users with a comprehensive description of their preferences. While it can be useful to learn "what" items a user prefers, the system described below more powerfully learns "how" one prefers items, as will be described below.

When performing a recommendation function the system may operate at the behest of the user to identify items, typically ones not yet rated by the user, but which the system predicts will have a specific degree of appeal to the user. Typically, but not necessarily, this may be a positive appeal. When performing a suggestion function the system may identify items that, when sampled by the user, are predicted to improve the quality of the preference profile. When predicting the appeal of an untried item, the system may use the preference profile to extrapolate the user's rating for that item.

The preference profiles generated by the methods and systems described below address "how" one prefers items and are different from the current state of the art that describes "what" items are preferred. To do this, the system may: (i) obtain descriptions of the items for which the user has a definable preference; (ii) discover what about an item drives that preference; and (iii) determine a shape, such as a representation of trends and attributes, of the preference. One methodological difference between the two approaches to obtaining profiles can be briefly summarized by noting that the current state of the art does it merely by associating item descriptions with item ratings. In contrast, the preference profiles described below are obtained by associating item descriptions, and optionally user context data, with patterns of item ratings. Another difference is that the preference profiles described below can be reported with varying degrees of specificity. This may be done, for example, by separately analyzing various subsets of items and the association of their descriptions with rating patterns.

The methods and systems described below are useful to construct a preference profile, to recommend and suggest items, and to predict a user's preference for unrated items. Data may be supplied by the user, or resident in the system. The user of the system will provide the data needed to identify items that the user has sampled, along with the user's ratings for those items. The user may also supply information about the context of his or her experience of those items. The system will have at its disposal information about the properties of the items. Additionally, the system may transform this data and/or supplement it with data computed from it. This data can be in the form of item traits or item attributes, depending upon the nature of information being portrayed.

The system processes the provided information in a series of steps. First, a portion of the items rated by the user is selected for analysis. Then, the process of preference model discovery or updating occurs on the basis of the selected items. The model discovery process itself may be done by first partitioning the rated items into various subsets, then analyzing these item subsets and finally assembling preference models from the results of the analysis. An early step in the process, item partitioning, allows the system to determine which types of items and under what circumstances the user has manifested a preference. In a next step in the process, analysis, the association between item information, and optionally user data, and patterns of ratings are computed. It is here that the shape of the user's preference for a subset of items may be determined, as well as the characteristics of the item and context responsible for driving that preference. At least three types of rating patterns may be considered: contrasting, polarizing and consistent. A next step is to assemble a series of preference profiles from the preference models discovered in the previous step. These preference profiles portray descriptions of "how" the user prefers the items. These assembled preference profiles can be used to support the recommendation and suggestion operations, the prediction function or may be translated into human readable prose preference descriptions and reported to the user. Since some suggestions are owed to the lack of a preference profile, this function may also be supported by preference model data.

FIG. 1 illustrates certain functional elements that may be included in a personal taste assessment system. An electronic device 10 containing a processor, programming instructions, a tangible computer-readable memory, and a user interface 12 may implement any of all of the system's functions. The electronic device 10 may be, for example, a smartphone (as shown), a computing device such as a personal computer, a laptop or tablet computer, a television set, a gaming device, or any other device having the elements described above. The user interface 12 may include elements for user output, such as a display or audio output. The user interface 12 also may include elements for input, such as a keypad, microphone or camera. Optionally, two or more of these elements may be combined, as in a touch-screen display which provides both input and output functions. In addition, the system may be distributed across multiple devices, processors and/or computer-readable memory devices.

The electronic device 10 may be in communication with an item database 20 containing trait values about numerous consumable items that are candidates for inclusion in the user's preference profile for rating, by the user, or for recommending to the user. In some embodiments, the items in the database may be curated, that is, selected by one or more professionals having experience in the field of the items. Some or all of the trait values may be assigned by the curators. Although FIG. 1 illustrates the item database as including wine data, it may include data for other items that may be perceived or chemically or tactilely sensed by a human, such as wines, spirits, cheeses, baked goods, frozen foods, pre-made entrees, restaurant dishes and other consumable items. Alternatively, the database may include trait values for items that are perceived through the sense of touch or smell, such as clothing, cosmetics and perfumes. Although some items also may be perceived by the senses of sight and/or hearing, for this purpose of this disclosure a trait must be associated with at least one of the following senses: taste, smell and touch. For the purpose of this discussion, a consumable item database, and in particular wine data, will be used as examples.

The electronic device also may be in communication with a memory on which is stored a set of consumer preference data including item ratings and preference profiles 30, which are described in more detail below. The item database 20 and consumer preference database 30 may be stored in the electronic device's memory. Alternatively, the databases may be stored on an external memory, as in a cloud storage application, and the device may access the data via a communications network such as a mobile phone network or the Internet.

The databases may directly communicate with the electronic device 10, or a remote processor 40 may communicate with the database and send data to and from the device. Any of the steps described in this document may be performed by the remote processor 40, the electronic device 10, or a combination of those and other processing devices. Thus, references in this document to "a processor" may include a single processor, a group of processors, or any processor within a group of processors unless the context clearly states otherwise.

The item database may be a mated database of characteristics of the items that may allow the system to serve as a surrogate for a human expert. In some embodiments, the database may include traits and/or attributes, each of which are described below.

Traits are item properties that are subjectively observed or detected by a human's chemical senses (taste or smell) or sense of touch or sight, or a combination of such senses. Traits relate to the sensory perceptions they elicit, and may include aspects of taste, texture, flavor, aroma, perceived sensory similarity or physical appearance. For example, a wine may perceptually portray itself with the traits of being ruby red and fruit-forward, with vanilla notes and tasting like a typical California Cabernet Sauvignon. Trait values are meant to capture the portrayal of an item's perceptual properties in a manner that permits their systematic analysis. To do this a trait will have an associated value which may be: (i) a quantitative measure such as represented by a numeric or ordinal data type (e.g., a number on an interval scale, such as 1 to 5 or a grade, such as Low, Medium, High); (ii) a value that may indicate status or membership such as a categorical indicator, exclusive or non-exclusive (e.g., in the case of an exclusive binary situation, 1 or 0 or in the case of a non-exclusive ternary indicator, strawberry and vanilla but not citrus); (iii) class indicators consisting of a categorical indicator of class membership and a quantitative measure of membership strength. Examples of categorical, quantitative and class trait names in the context of wine are Vanilla Flavor, Fruit Intensity and Napa Cabernet Style respectively. In other embodiments the traits may not have unique associated values but instead have a range of values. Traits of the same name may also have multiple forms of associated values such as a numeric and ordinal representation of a quantitative aspect of a trait.

Attributes are characteristics that are fixed and do not change in an part based on sensory experience, i.e., the are independent of sensory experience. For example, in the case of wine, attributes can be grape, geographic place or region of origin, climate descriptor, vintage and the like. As with traits, attribute values can be represented by quantitative measures, by indicators of category membership or by classes.

The determination of what item characteristic constitutes a trait versus an attribute turns solely on what that characteristic portrays and not on how a value for it is obtained. If a characteristic portrays in any part how an item tastes, smells, feels, looks or sounds then that characteristic is a trait. Thus, even if the intensity of a wine's fruit expression was computed as a function of the wines attributes, e.g. grape composition, terroir, climate and wine making methods, such a value would be ascribable to a trait. Also in cases wherein auxiliary item characteristics are computed (see later description), any such characteristics would be considered traits if data derived from a sensory experience entered into the computation. This is because, as defined above, such a characteristic would not be independent of a sensory experience.

Classes are a data type that can be used to portray relatedness among items. This relatedness may be captured by elaborating classes into a tree-like hierarchy. For example, a set of classes formed by a country's boroughs, cities, counties and states can be use to portray the geographic relatedness among the residents of a country. Residents in one borough are related to residents in another borough by virtue of all being residents of the same city. Residents of a city and non-city residents of a county are all related by the fact that they are all residents of the same county. Next, all county residents are related through their mutual residency in the same state and all state residents are related to each other because they all reside in the same country. The boroughs form the base classes of such a geographic hierarchy and the higher levels of this hierarchy are formed by compounding together related lower level classes. The class formed by all residents of the country constitutes the apex of the hierarchy. Such a tree-like hierarchy of classes may be used to portray the patterns of relatedness, for example as defined by perceptual similarity, among items. A hierarchy of classes may also be used to capture non-perceptual aspects of item relatedness by virtue of their non-sensory properties.

In this document, the item traits and attributes collectively may be referenced as characteristics. Throughout the document the "and/or" enumeration of these item characteristics is used to indicate that whatever is being described is applicable to any or all combinations of item trait and attribute values. Sometimes, for brevity, the term item characteristics may be used, and in such cases it is to be understood to refer to any and all combinations of the aforementioned item properties. When, due to inadvertent omission, some but not all of the types of item characteristics are referenced, it can be assumed that whatever is under discussion is applicable to all types of item characteristics if their absence lessens the applicability of the described process.

In some embodiments, the traits may be provided by an expert in the field of the relevant items, such as a sommelier in embodiments that involve wines. Traits may have a binary value (e.g., detected or not, present or absent), while others may have an intensity measure (e.g., on a scale of 1 to 5). For example, wine tastes and textures may be captured by quantitative data types that provide a numeric measure on a fixed scale that relates to the degree of expression of a particular trait. The wine flavors may be captured by binary forms of categorical variables that show whether or not a particular flavor is deemed to be present in the wine. For example, the flavor vanilla may either be detected or not. Wine styles may be captured by a class data type which itself, is a combination of a quantitative and a categorical variable. In a class, a categorical data type is used to indicate membership in a given class and a quantitative data type is used to indicate the strength of class membership, e.g. on a scale from 0 to 1. For example, given a set of perceptual wine styles classes, e.g. California Cabernet, Napa Cabernet and Sonoma Cabernet, a red wine may be indicated to have membership in the California Cabernet and Napa Cabernet classes with membership strengths of 1.0 and 0.8 that, respectively, indicate the degree of taste similarity between the wine and the tastes that the style classes typify. The associated values of any or all of the sensory traits may be objectively determined by one or more experts, such as members of a human tasting panel.

Some traits also may have one or more corresponding non-sensory representations, i.e. attributes, reflecting a characteristic that is also perceivable by the human expert. For example, a wine's alcohol level may have an attribute value in terms of percent by volume, either as determined analytically, as reported or as estimated by a wine expert tasting the wine. However, the database also may capture a measure of how much alcohol is actually perceived by the human expert. This is because the perception of alcohol can be affected by other taste, texture and flavor traits of the wine. Thus, the embodiments described in this document enable the system to create a profile and make recommendations based on perception of traits such as taste, texture or flavor, rather than merely on an actual objective degree of expression of those traits. Note that in cases where such perception may be approximated from the values of attributes, the result is still a representation of a trait value even if it was not derived from trait values. This is because the property of being, a trait is lodged in what is being portrayed and not in how a value is assigned to it. In some embodiments, certain characteristics may be excluded from the database, or they may be captured in the database but not used in the methods described. For example, characteristics such as aromas, expected retail price, country of origin or other characteristics may or may not be considered.

Before values can be attached to class data types, the classes themselves must be defined. As described earlier, the elaboration of classes into a hierarchy may be used to capture information about the relatedness of items. The approach used in this embodiment was to take relatedness to mean the similarity between classes. In the case of wine class traits for example, wine class trait hierarchy may be created by assembling a set of base classes representing all of the important, perceptually distinct styles of wines. These base classes and their perceptual properties may be determined a priori by a wine expert. Higher level classes may then be assembled by combining groups of the wine style base classes in accordance with their mutual perceptual similarity to each other and mutual perceptual dissimilarity to the rest of the base classes. This resulting set of higher level classes may be called wine style families. The wine style family classes may be combined into further higher level classes, that may be called wine style family groups, on the basis of their mutual perceptual similarity with each other and dissimilarity to the rest of the wine style families. Alternatively, a wine class trait hierarchy may be created by clustering together a set of given base classes on the basis of numerical computations of pairwise class similarity. For example, if the base classes are assigned quantitative and categorical trait values then a variety of methods may be used to compute pairwise class similarity. In one such method, these trait values may be treated as distances along orthogonal directions in an abstract vector space and the dissimilarity between classes taken as proportional to their separation in that space. Using such an approach a clustering algorithm may be used to progressively combine pairs similar classes, starting with the base classes, into a hierarchy of classes. A higher level class is formed with each combination of classes that comprise the hierarchy.

For example, FIG. 7 shows an example of a class hierarchy built by clustering wine style base classes. The left part of this illustration shows the outline of the red wine class hierarchy that was built on a set of 15 wine style base classes. The vertical line segments in this diagram connect together classes. The rightmost lines in the diagram indicate the next to the lowest classes formed by connecting pairs of base classes. The formation of intermediate level classes can be traced out by following the pairwise connections of lower classes linked by the vertical lines. The right part of the illustration provides information about the traits and attributes that were associated with each wine style base class. The attributes are: the grape composition category and country of origin. The quantitative traits are rendered as miniature bar graphs: fruit intensity (FI), mineral intensity (MI), body (B), acidity (Ac), oak intensity (OI) and tannin intensity (TI). The indicated categorical traits are listed in the Flavors section and include the fruit (Red or Black) and various other flavors. For illustrative purposes the base classes were explicitly combined into four higher level classes the divisions of which are indicate by the dotted horizontal lines. The similarity of base class traits and attributes within each of these high level classes is readily apparent as are their dissimilarities across these classes.

In general the assignments of items to classes and the determination of the strength of that assignment, here taken as similarity, may be made: (i) by human experts; (ii) computed on the basis of the item's properties; or (iii) obtained from semantic similarity analysis of written material about the item, e.g. an item's written description, review or bibliographic data, or (iv) a combination of preceding. The previous paragraph described one method for determining pairwise item similarity on the basis of item properties, e.g. taking the item traits and/or attributes as vector values in an abstract space. Another systematic method deduces the similarity relationships among items via link analysis or via graph relations such as may be done to process the connections among items such as web pages or documents into measures of similarity. Where such systematic methods fail to produce the desired character of similarity, human judgment can be used to generate all of the required class assignments and similarity measures. For example, experts can manipulate tokens representing items in a one-, two- or three-dimensional space such that the separation between those tokens is representative of their dissimilarity. In general, assignment of items to classes may be made for items having sufficient similarity to the classes.

The consumer preference database 30 may include identifiers for items that a consumer has perceived, the consumer's ratings for those items, contextual information and extant preference profiles. The ratings and contextual information will be described in more detail below.

Any or all of the steps described below may be implemented by the electronic device as the device's processor executes programming instructions that are stored in the device's memory. For example, the electronic device may be programmed with a software application that performs any or all of the functions described below.

Figure 2:
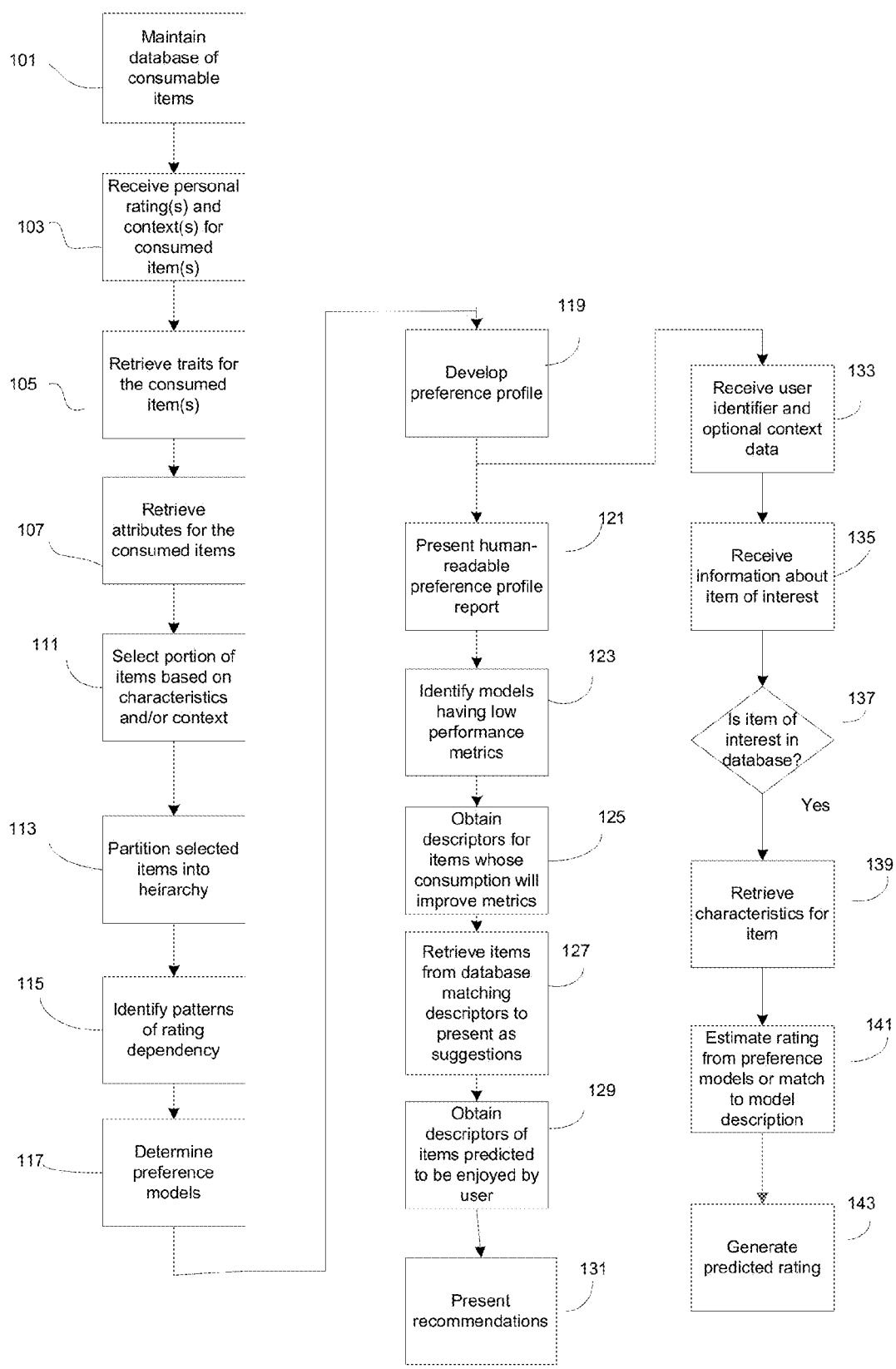
FIG. 2 is a flowchart illustrating steps that may be performed by a taste assessment system.

FIG. 2 is a flow diagram that illustrates a method of assessing a person's personal taste for consumable items, for obtaining item suggestions and recommendations, and for obtaining rating predictions, which may be implemented by a system such as that shown in FIG. 1. The system may maintain, or it may access via one or more communications networks, a database of items 101 that may be rated, such as consumable items. Each item in the database is associated with one or more sensory traits and optionally with one or more attributes. The system may present the user with a user interface through which the system will receive a person's rating for one or more of the items 103 that the person has perceived. The rating may include an ordered rating such as a number from 1 to 5; a grade such as A, B, C or D, or a descriptor such as "love it", "like it", "it's OK" (or "so-so"), or "don't like it," In some embodiments, the rating may be a single response, such as those listed in the previous sentence. Optionally, the rating context may include responses to one or more questions about the environment that in which the person experienced the wine, such as "dinner out," "at a friend's home," "home with family," "free," "celebration," etc. or may include information generated by the system from geotag information received from the input device, such as GPS coordinates. In various embodiments, the context may include a date on which the consumer rated the item or on which the system received the consumer's rating. The system may access the item database to retrieve values for the sensory traits that are associated with the perceived items 105. The system also may retrieve the attributes for each of the perceived items 107. For example, in the context of wine, the attributes of these wines may be any or all of color, grape(s), style, growing region, or year. Optionally, in addition to the wine characteristics already in the database, selected traits and/or attributes may be contingently combined to form additional auxiliary traits, attributes or classes. The association of items and traits with items will be maintained in the item database (e.g., the wine data database 10 of FIG. 1. The system may select a portion of the perceived, items for use in profile construction on the basis of the item traits and/or attributes and/or rating contexts 111. For example, the system may select only red wine items in order to develop a profile for red wines or for red wines consumed for vacation rating contexts in order to develop a profile for red wines consumed in a light hearted setting.

The system will partition the selected items into a variety of subsets based on item traits and/or attributes and/or rating context data 113. This partitioning permits the system to develop preference descriptions having a range of specificities, i.e. with what particular combination of types of items and context was the preference manifested. The system will analyze the person's rating data in each item subset created by the partitioning process. It will identify one or more patterns of dependency 115 between the user-assigned ratings of the items in the subset and one or more traits and/or attributes and/or rating contexts of the rated items. Note that the "user" may be the person who rated the items, or it may be someone who is accessing the system with user information, such as a sales representative or restaurant employee.

The system will determine one or more preference models for the user using the subsets of items created by the hierarchical partition process 117. Suitable preference models are discovered on the basis of their ability to support various types of associations between the ratings of the selected items and their item characteristics and/or context data. A preference model comprises a function, such as a regression function, that portrays a specific form of a systematic dependence between items ratings and the item traits and/or attributes and/of their rating context. A systematic dependence may take the form of trending, focal, polarizing and/or consistent patterns of rating dependence. In the present embodiments these patterns of systematic dependence may include a trending contrasting type, a focal contrasting type, a consistent type and a polarizing type as described below.

In addition to the identity of the rating pattern, the model includes performance metrics that describe the degree to which these associations are supported by each item subset and other metrics that describe other aspects of that association specific to that model. Each model also has associated with it the values of their item characteristics and/or context data that determined the inclusion of the items into the analyzed subset. The model also may include the identity of the item characteristics and/or rating context data supporting the association between it and the pattern of ratings.

Suitable preference models are may be discovered on the basis of their ability to almost support various types of associations between the ratings of the selected items and their item characteristics and/or context data. In some cases it may be determined that such an association may be supported if additional ratings of specifically characterized items are obtained. Identifying such preference models may form the basis for suggesting additional items for the user to rate. Thus, preference model identification may encompass extant and/or potential (latent) patterns of dependence.

A preference profile is developed, for one or more consumers on the basis of those preference models whose performance metrics indicate that the item characteristics and/or context data support a rating dependency pattern 119. The preference profile may be a collection of preference profiles and also all of the assembled preference models. Each profile is compiled to convey preference to a given degree of specificity and completeness. This may be done by combining, preference models in various ways and measuring, among other things, the specificity, multiplicity, completeness, uniqueness, consequentiality and informativeness of the preference description represented by the assemblage. These measures, described later in this text, capture various qualities of the preference profile description that are of importance to the user. Collectively they determine its salience. These encoded representations of the user's preference may be stored in the consumer preference database 30 for further use along with all of the preference models.

Several things can be done with the preference profile developed by this system or, equivalently, an earlier developed profile retrieved from the consumer preference database 30. The system may present information from a user's profile in a human readable preference profile report 121, such as in a document, electronic file or user interface screen, and/or it may use the profile to generate suggestions 127 or recommendations 131 for the person or make predictions of item appeal 143. Recommendations are items that the system identifies as being likely to be enjoyed by the user based on the user's preference profile. If desired however, the user can request recommendations for items having any given level of appeal, for example to check to see if their taste for previously uninteresting items has changed. Suggestions are items that the system suggests that the user sample and rate to help the system build a more accurate preference profile.

For example, in one embodiment the system may evaluate the performance metrics of the assembled preference models and identify those having low or below acceptable levels. Since these metrics can be diagnostic of specific problems it is possible to obtain descriptions, i.e. values for traits, attributes and/or classes, for items that, when rated, can be expected to improve the performance metrics 125. The system would then access the item database to retrieve items whose properties match the item information associated with those items and present them as suggestions 127. For another example, in one embodiment the system may review the preference profiles and process their contained preference models to obtain traits and/or attributes for which the patterns of preference in the profile indicate the person would rate such items the highest, disregard the items characteristics for which the patterns of preference in the profile indicate the person would rate such items the lowest. The system would then access the item database to retrieve items whose properties match the item characteristics associated with appealing items and present them as recommendations 131. In another embodiment the universe of recommendable items is constrained to those whose traits and/or attributes satisfy a user-supplied criterion such as user-supplied parameters (e.g., price), or one or more situational parameters (e.g., available inventory at a retailer or distributor or pairs with a certain food). Optionally, for a third example, the user may present an item that the user has not yet evaluated and request an assessment of the item wherein the patterns of preference in the user profile are used to generate a prediction of the user's rating for the unevaluated item 143.

Figure 3:
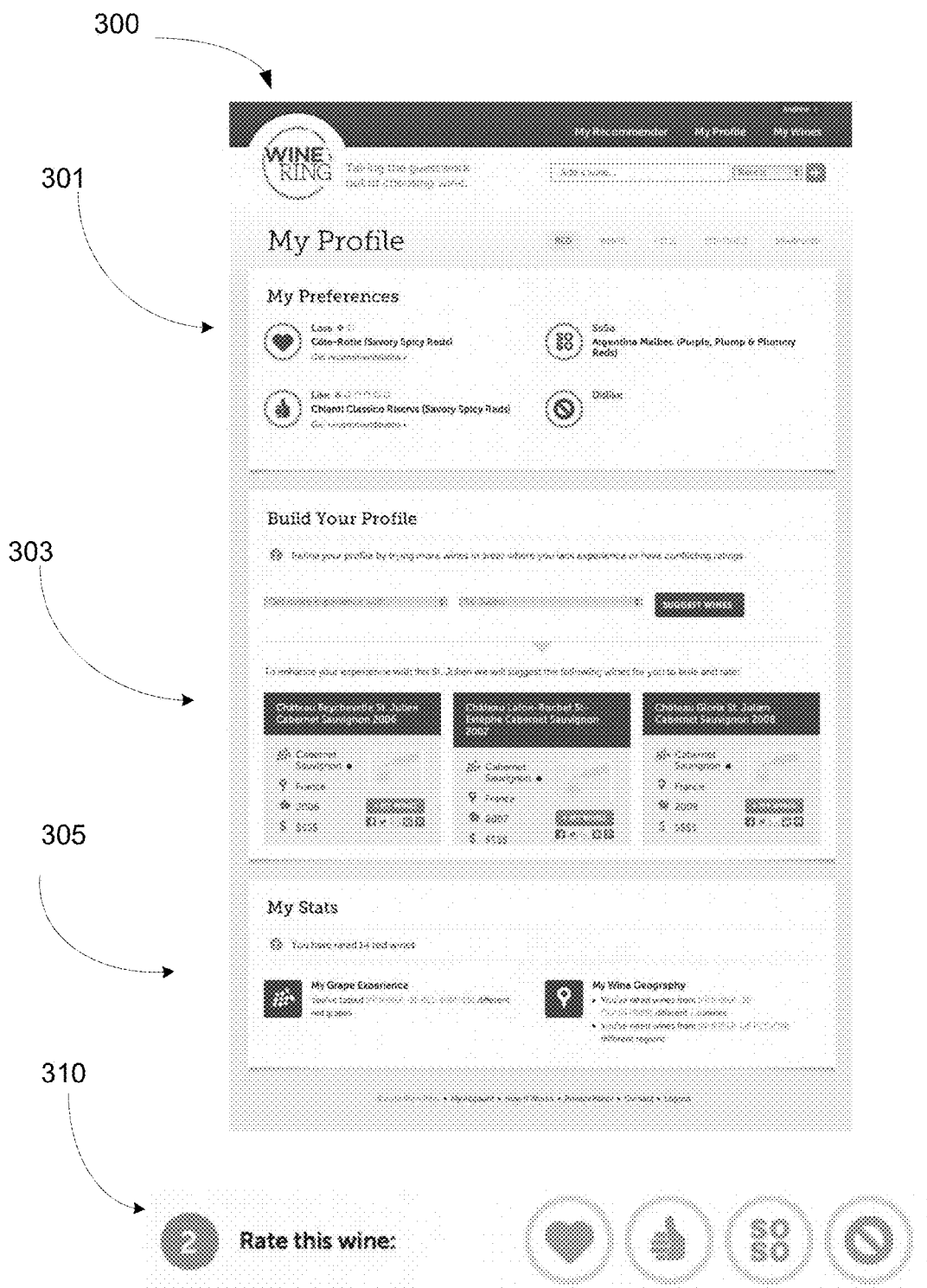
FIG. 3 is an example of a user taste profile report.

The preference profile may include information about associations between characteristics and/or context data and the contrasting, consistent and polarizing patterns of ratings. These patterns describe those traits and/or attributes and/or classes that explain ratings over a range of relatively higher and lower values, or which pin ratings to a circumscribed, range of values, or which define a split in the pattern of preference. As noted above, some or all of the preference profile may be presented to the user by displaying, transmitting, printing or saving a report 121. An example of a user interface 300 showing such a report is shown in FIG. 3. As shown, the report is presented as an electronic user interface and includes a preference section 301 that identifies items or classes of items and expressions of degrees of preference for each listed item or class. The report may also include a profile builder section 303 that provides the user with suggestions of items to sample and rate to help improve the quality of the er's profile. When the user indicates that he or she has sampled or is ready to rate the item, the user interface may present, on the same screen or one or more different screens, a rating field 310 through which the user may input and the system may receive the user's rating for the item. This profile builder function will be described in more detail below. The report also may include a profile statistics section 305 describing quantitative measurements of the user's profile, such as a number of items rated, a number of items rated within a particular class, and/or a number of items rated that share one or more common attributes. The report also may include a characterization of the user's level of experience with a class or other group of items, such as a percentage or other measure of the possible items within a class that the user has sampled.

The report need not include all of the identified preference traits and/or attributes and/or context data. Instead, the system may determine a subset of salient traits or attributes or context data for inclusion in the preference profile using any possible selection criteria. The subset may include a first group of item descriptions and/or contexts under which the user exhibits a contrasting pattern of preference, and a second group of item descriptions and/or contexts under which the user exhibits a consistent pattern of preference and a third group of item descriptions and/of contexts under which the user exhibits a polarizing pattern of preference.

Returning to FIG. 2, as noted above the system also may recommend 131 one or more items that the person has not yet rated. The recommendations may be determined based on items that are in the database that have that have the characteristics consistent with the user's preferences under the conditions specified by any given contextual criterion. For example, when recommending an item the system may access the person's taste profile and retrieve a set of the item characteristics associated with a high range of ratings, then access the item database to identify at least one item having one or more characteristics that correspond to the characteristics for which the user has exhibited a positive preference, while omitting those items having characteristics for which the user has exhibited a negative preference, i.e. low ratings. Optionally, the person may be permitted to identify characteristics of recommendable items to further narrow the selection to include or exclude items that have the identified characteristics. Recommendations may also be made for previously rated items. For example, the user may request a recommendation for an item that is known to be appealing but which also satisfies additional criteria, e.g. price or suitable for pairing with a given food.

Alternatively, recommendations may also be obtained by first selecting those candidate items that satisfy any provided criterion for item characteristics, e.g., as described in the previous paragraph above, and then submitting the items to the rating prediction functionality used for predicting ratings. All items whose predicted ratings matches the values consistent with the appeal specified for recommendation, e.g. have high ratings, are candidates for presentation to the user. The choice of approach, identification as described above or screening items by prediction as described here, may have different performance characteristics particularly if the item database is very large.

Figure 4:
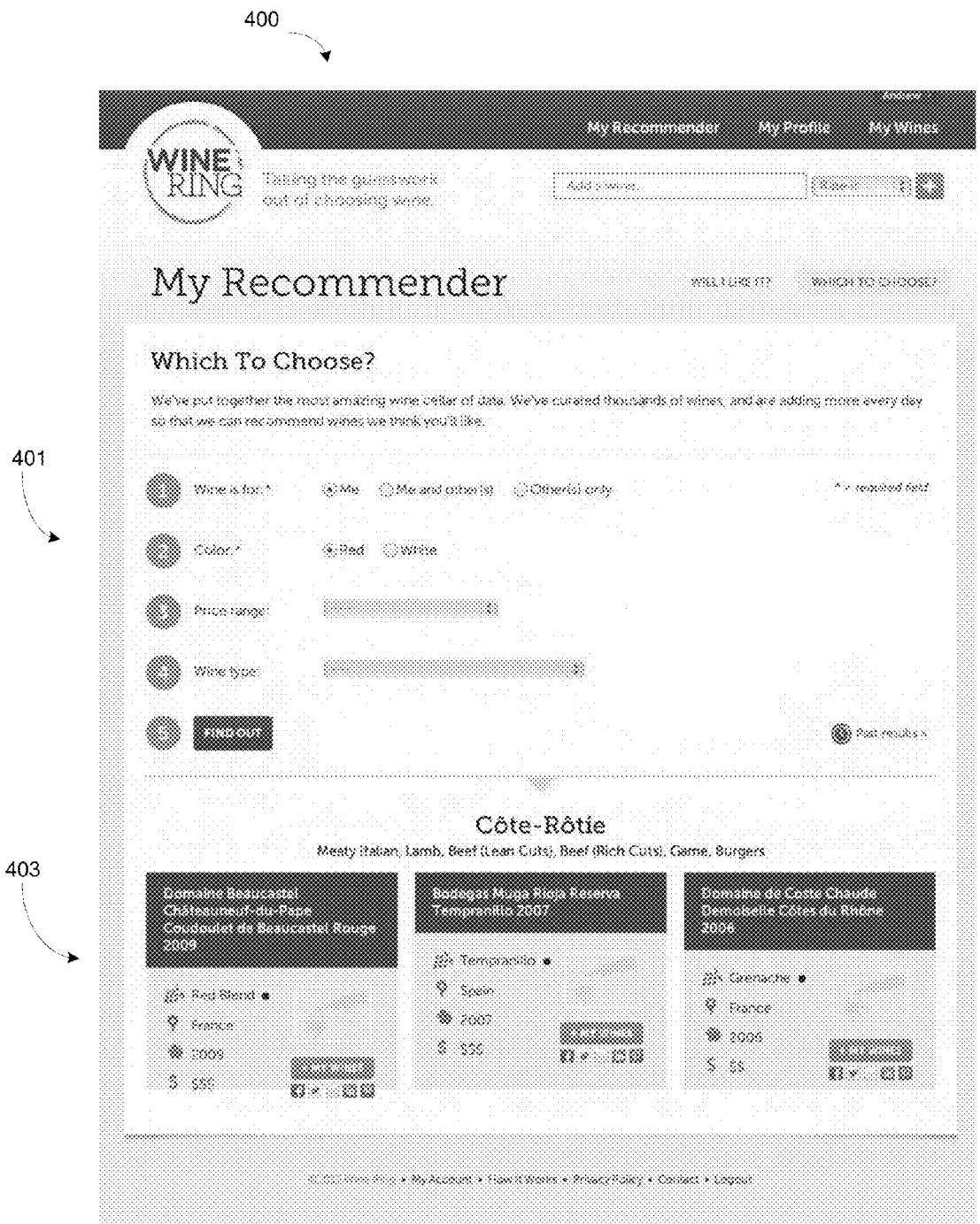
FIG. 4 illustrates an example of a user interface for providing recommendations.

An example of a user interface 400 that provides recommendations is shown in FIG. 4. The interface 400 includes one or more selection fields 401 through which the user may enter or select various criteria that the recommended item must satisfy in order for the system to recommend it. The criteria may include, for example, one or more traits, attributes, or other characteristics such as color, price range or maximum price, or type. The criteria also may include a context such as a food pairing or a type of event. When generating the recommendation, the system may require the recommended item to satisfy all of the criteria, some of the criteria, at least a baseline set of criteria (such as color and price range), or some combination thereof. The user interface may also include a recommendation field 403 through which the system presents the user with recommendations based on the criteria and the user's profile.

In general, a recommendation system uses data for items rated by a user to identify one or more other items to recommend to the user. Recommendation system performance can be negatively affected by, among other things, a relative paucity of ratings for, or an inconsistency in the ratings of, certain types of items or subsets of items. Thus, the presently-disclosed system may also identify not-yet-rated items that, if rated, are expected to have some utility to the recommendation system itself. The user may or may not like the items, so the items may not necessarily be "recommended" for the user, but if the system were to receive data regarding the user's preference for the items, the system could use that data to improve its future recommendations for that user. Here, the identification of items that are of direct utility to the system is called "suggesting."

Thus, when suggesting item(s), the system may proffer an item that will help the system improve the user's taste profile. For example, the system may assess the user's experience with a particular class or other group of items (referred to in this discussion as a category) and make suggestions for additional tastings that will help the user get more experience with items within the category, resolve conflicting information about preferences within a category or resolve conflicting information about the rating for a particular item. For example, the system may assess a user's experience 123 with a category of wines, such as "Chianti" or "South American Shiraz." The system will apply any suitable algorithm to determine an experience score for the user's experience level with items of that category, wherein the algorithm includes variables that include a number of wines (or other items) tasted in the category, along with the relative variety of wines (or other items) tasted within the category. For example, if a user has tasted ten wines within the category, if the wines all have varying traits and attributes then the system may assign one point for each wine and give the user an experience score of 10 for that category. However, if eight of the wines tasted are have very similar attributes and/or traits, may assign a number less than one for the similar wines, or the system may assign a maximum total number (e.g., 3) for the similar wines so that the remaining five similar wines are not counted in the calculation of the user's experience score. The score may be a numeric score or a word-based or graphic descriptor based on a numeric score. For example, a relatively high score may show that the user has "significant" experience a category, while a low score may show that the user has "little" experience in a category.

Thus, the system may identify items 125 from its database that are within the category and suggest 129 that, if tasted and rated, those items will improve the user's experience score for the category. These may include items the user has not yet rated and which have attributes and/or traits that the user has not yet experienced in the user's rated wines, or which the user has experienced less than other attributes and/or traits as indicated by wines rated by the user. As an example, if the user has tasted eight full-bodied, fruit-forward Chiantis but only one medium-bodied Chianti, it may suggest 127 a medium-bodied Chianti to the user. The activities to be carried out in the suggesting process may depend upon the implementation of the recommendation system. Additional details about a suggestion system will be presented below.

In some embodiments, the system may provide a user with an ability to gain more experience with a particular category of item and improve their profile with respect to that category by supplementing the data in their profile for rated items in that category. For example, as shown in FIG. 3, the system's user interface 303 may provide the user with a selectable list or other set of categories. When the user selects a category from the list, the system may suggest one or more items that, if rated by the user, will improve the user's profile with respect to that category, or with respect to one or more characteristics of items within the category. The items may be items that will improve the user's experience score, as described above.

The system may also identify items within the category having attributes and/or traits for which the user has provided ambiguous ratings. For example, ambiguous ratings in the context of model based on a consistent rating pattern would be manifested by a low rating homogeneity. In the context of a model based on a contrasting preference, ambiguity would be manifested by ratings not clustered closely enough around the trending or focal rating patterns. This ambiguity may be measured a fitness metric that portrays how well these ratings fit the user's preference model. In cases where the fitness metric is marginal or below a threshold then having the user rate additional items may improve the model fitness.

For example, when seeking, to fit a consistent pattern of preference to a subset of items, a user could have rated two items as "like" and two items as "don't like," In such a case there would be insufficient rating homogeneity to indicate a consistent pattern of preference. However, if the fitness metric for this model is near the acceptance threshold, it may be appropriate to suggest that the user rated one or several items that are of the same category and/or that share a same attribute. For example, if the items sampled were atypical, or if the context of the item experience were atypical, then such cases repeating the item experience may reveal a preference that was masked by unusual circumstances. In the case of a preference model based on a consistent preference, the system may identify from its database additional items to suggest 125, having the same characteristics as the partitioning process used to construct the subset of items associated with the item.

More generally, for other types of preference models, as will be described later, other methods can be used to identify other items to suggest to the user to help resolve the apparent conflict in the user's preference model. For instance, in the case of a trending rating dependence pattern, where the fitness metric is degraded by ratings for items having particular characteristics, then the system would suggest further items of the same sort. Additional ratings would resolve the question of whether the lack of model fitness was due to atypical in the item experience or to intrinsic taste of the user.

The system may also recognize a case wherein the ratings for one or more particular item(s) appear to be outliers with respect to the predictions of the item ratings made on the basis of the preference model. In contrast to the previous example, the preference model having such outlying ratings will still have sufficient model fitness to merit inclusion in the preference profile. It may be the case that exclusion of such outlying item ratings is what makes the difference between a sufficient confidence in the preference model. However, if these outlying ratings represent atypical experiences of the user with the item, i.e. either an unusual item realization or experience context, then further action can help resolve whether what is being manifested is intentional or accidental preference. The user can be directed to re-experience the outlying items or the experience items to which they are similar and whose characteristics would merit including them in the item subset created by the partitioning process. If the new ratings are inconsistent with those of the outlying items then the outlying ratings can be marked as atypical and eliminated from the preference model. Otherwise, the instance would have to be recognized as an item preference that the profiling system cannot yet describe.

In some embodiments, the system may recommend 131 items that the user is likely to enjoy. Recommendation processes will be described below. For example, the system may receive a request for a recommendation. The request may be a specific request submitted by a user. Or it may be an automated command to provide a recommendation whenever a user performs a certain action, such as accesses the application. The request may include one or more criteria, such desired traits and/or attributes, a context, or other information that the system may use to generate a recommendation for one of the items in the database.

Figure 11:
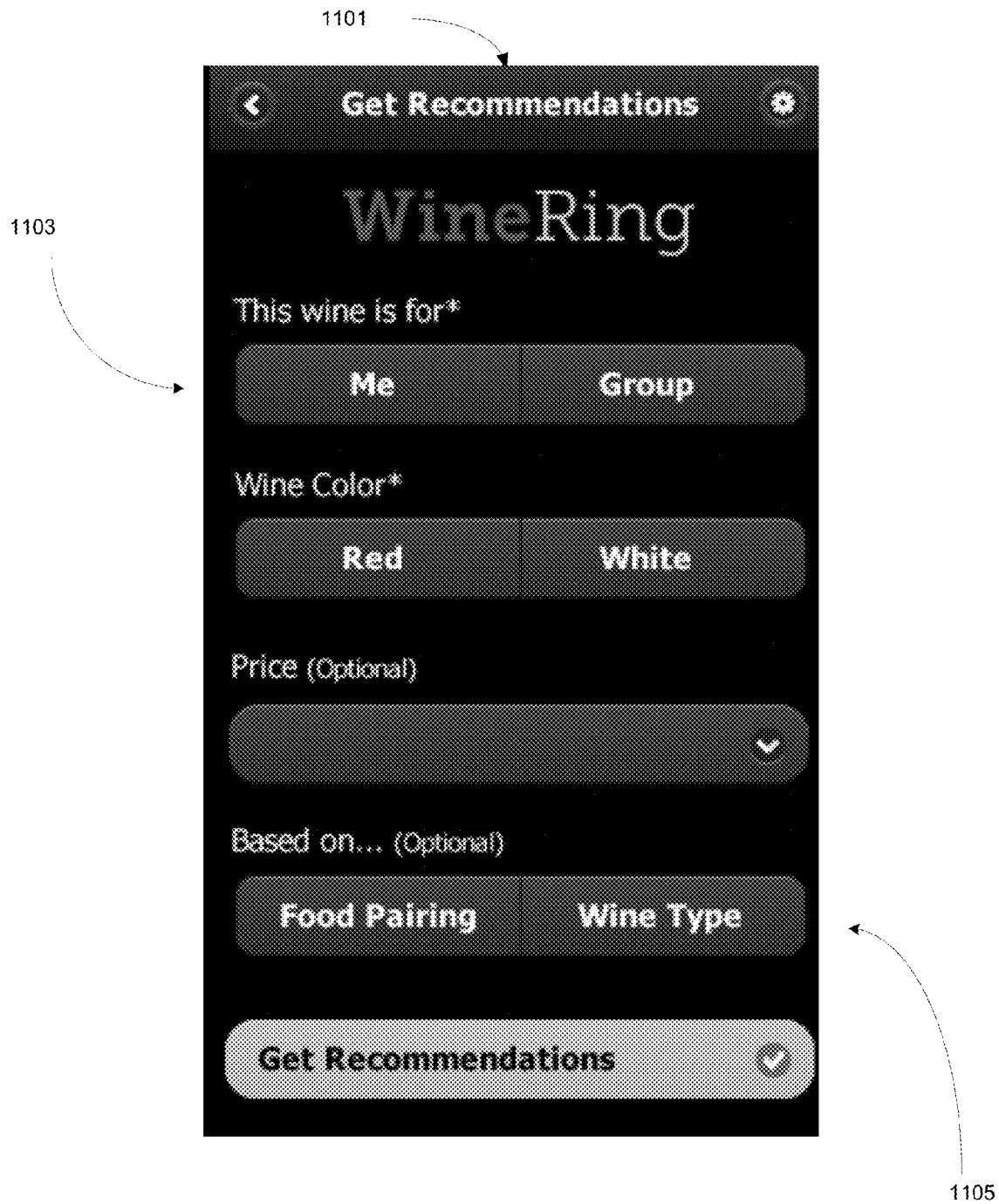
FIG. 11 is an example of a user interface for obtaining recommendations.

An example of a user interface showing this is found in FIG. 11, which shows an example of a user interface 1101 through which a user may request a recommendation. The interface may include a context field 1103 in which the user indicates whether it wants a recommendation for the user him or herself, for another user, or for a group. For example, a group recommendation made on the basis of profile constructed by matching and merging the preference models of multiple users. The system will access the user's profile, another user's or a group profile depending on the user's selection. The interface also may include one or more characteristic fields 1105 where the user may identify several criteria that the recommended item must (or is preferred to) satisfy. Such characteristics may include type and price, for example.

In some embodiments, a personal taste profile system also may contain a prediction functionality—i.e., a process that allows a user to determine whether the user or another user) is likely to like a specified item, based on the relevant user's profile data. For example, a user may be permitted to enter a user identifier 133. The system will use the user identifier to identify a person whose profile will be used for the prediction function. Optionally, the user can provide a context under which the item was, or is to be sampled. Such contextual information may be relevant to the experience of the item for the situation in which the item is to be consumed (e.g., food and wine pairings).

The system will then receive identifying information about a specific item of interest 135. The data may be a serial number, a universal product code, a name or other description, scanned barcode data, a photo of a label that is processed using image recognition technology to extract identifying information, or any other data that the system may use to identify the item. The system will determine whether data for the specific item of interest is available in an item database 137. If so, the system may retrieve one or more traits and/or attributes of the item 139, process the retrieved characteristics through the relevant user's profile 141, and generate and output to the user a predicted rating for the item based on the process 143. The rating dependency patterns of the preferences models in the profile determine how the item characteristics are processed. For consistent patterns the predicted rating is the representative rating of the item subset comprising the model. In the cases of the contrasting, and polarizing patterns, the values of the item characteristics and context data (if present) are entered into the preference model, for example as implemented by a regression function, and the result taken as the rating prediction. The performance metrics of the preference model will provide measures of the certainty with which the function's value can be taken as indicative of how the user would rate the item. This metric and optionally others can be used to select from among; the predicted values to present as the predicted rating. When no preference model can be matched to the characteristics of the item, i.e. this item would not have qualified for inclusion in any of the subsets generated by the partitioning process, then a prediction can not be made and so an inconclusive result can be returned. An inconclusive result can also occur if the performance metric (s) of none of the preference models indicate that their results are not sufficiently reflective of how the user would have rated the item.

In an example of using the prediction system for wine, a user may use a mobile electronic device to scan a barcode or QR code or capture a photo of the label of a wine. The system may process the barcode data, or extract label data from the photo, using any suitable optical recognition technology. When the wine is identified, the system may access a database of curated wines to determine whether the identified wine is in the database. If the wine is in the database, the system may retrieve from the wine database one or more characteristics of the wine. The system would then process these attributes through the user's profile as described above. These results are then transmitted to the user saying that they are likely to like or dislike the wine, as the case may be. If the results are inconclusive, the system may decline to make a prediction or report that it had an inconclusive finding.

When selecting a user profile, the system may default to the requesting user's profile, unless the requesting user requests that the system access another user's profile.

In some embodiments, the system may regenerate a new preference profile for a user, or it may update an existing profile based on new ratings or item characteristics.

In some embodiments, for the purposes of obtaining an item recommendation or for expanding the user's own profile, the system may augment the user's profile with portions of preference profiles from one or more users. Suitable users may be identified first on the basis of their willingness to make their preference profiles available for sharing. Next, an overall similarity score may be computed between the preference models comprising user's profile and those of the users who make their profiles available for this purpose. A first step in computing the similarity score may be identifying which of the user's preference models match those of each of the cooperating, users. This is done on the basis of the item subset descriptions of the preference models. The system determines whether the user and the cooperating, user share the same preferences for the subset of items in each preference model. In cases where the preference models have matching rating dependence patterns, this can be done by computing the similarity of the model parameters.

For example, in the case of a consistent pattern of preference, by measuring how closely the representative ratings for the item subset compares for each user. In other rating dependence patterns it will depend primarily on the item characteristics that support the rating dependence and the direction of that dependence, e.g. increasing or decreasing ratings as a function of trait intensity and, in the case of focal patterns, the focal zone of item characteristic values. In cases where there are different rating dependence patterns for the same subset of items, then similarity may be computed on the basis of ratings predicted by the preference models of both users for a set of items. This set of items could be comprised of the union of the items rated by the user and the cooperating, user. The more closely the ratings of these items are predicted by the models of both users, the more similar their preference for the item subset on which the preference model is based.

A collective preference similarity score may be computed for each cooperating user and those which satisfy a similarity criterion are considered next. Considering only the pool of qualifying cooperating users, the system may identify which of the cooperating users preference models are not present in the profile of the user. As in the previous step, this may be done on the basis of the item characteristics that determined inclusion of items in the subsets comprising the preference models. The preference models so identified in this process are candidates for either adding to the user's profile or for a basis upon which to make recommendations. Choosing which of these profiles or how many of them to use will depend upon how the system is implemented. One may choose to use only the candidate preference models from the cooperating user whose preference profile was most similar to the user. Other possibilities include using only those preference models whose item subsets are for types of items very similar to, or very different from, the items already rated by the user. However preference models are chosen, the system may add them to the user's preference profile and generate an augmented profile for the user. Alternatively, the system may add them to the collection of the user's preference models and use the augmented collection to perform recommendation function. This process may then allow the system, and optionally the user, to identify other users preference models that are similar to the first user's models for a common collection of types of items. The first user may then assume the cooperating user's preference models for different types of items for which the first user does nor yet have a preference model. This process allows a user to bolster their preference profile with the experiences of other, more experienced users who also have similar preferences for the types of items they have in common.

In addition, the system may offer a user the ability to compose a group of two or more selected users and recommend hems that, based on the profiles for each of the users, are expected to be liked to definable degrees by each of the users based on a merged profile created from the users' profiles. As used in the document, an item may be expected to be liked by multiple persons so long as none of the relevant users is expected to dislike the item. A recommendation for several users may proceed first matching the item subset descriptions of the preference models from all users in the group. The matching profile models are merged by inverting the rating dependency functions and identifying regions of item characteristic values for which various degrees of rating maximization can be attained for the users comprising the group. This is straightforward in the case of matching preference models based on the consistent pattern of dependence since no function inversion is required. The representative rating associated with the subset of items in the preference model of each user can be directly used. If the ratings for the group satisfy some social welfare function, e.g. no unappealing ratings or at average appealing rating, then the item characteristics used to form the subset can be used to identify recommendable items. In instances where users have no matching preference models one may assume a default rating for the item subset, e.g. So-So, but with a zero level of confidence.

Although the examples described below illustrate retrieval of ratings, item characteristics and user rating context data, any or all of the data points, i.e. item characteristics, ratings or rating context data, may be adjusted, weighted or transformed to replace or supplement the data before the item selection, pattern identification and preference model discovery or at any other point in the profiling, suggesting, recommending or predicting process. This disclosure is intended to cover all such embodiments. As previously noted, the result of any such procedures that incorporates sensorial derived item information, e.g. traits, cannot be considered an attribute because of its dependence on the perception of the item and so therefore may be taken as a trait.

When determining patterns of dependency, some items in the database may be given more weight or emphasis than other items in the determination. Similarly, individual traits and/or attributes may be given more weight or emphasis than others. This may be done by a simple multiplier applied directly to item characteristic values or rating values, such as by multiplying each value for the rated items by a weighting factor or by applying such weights in potentially other manners to values calculated elsewhere in the analysis methods. The system may use context information to determine how to weigh the relevant item characteristics or ratings. For, example, when developing a wine taste profile for the consumer, a wine that the consumer tastes on vacation in the wine's country of origin may be perceived differently than a wine tasted at home. In addition, more recent ratings may be given higher weights than older ratings. For example, ratings that are more than a threshold period of time old may be assigned a weighting factor of less than 1.0 so that they are given less importance in the preference profile than more recent ratings are given. This also helps the system adapt the preference profile to the consumer's changing tastes over time.

Not all of the items rated by the consumer are necessarily passed on to the next step for processing. One or more criteria, based on certain item characteristics and/or contexts, may be required before an item is selected, or a context may be used as a gating criterion for whether an item is considered. For example, in the case of wine, a selection criterion may restrict a preference profile to consider only the past 12 months of wine ratings. Or a user's preferences for wines consumed for pleasure may be profiled separately from the consumer's preferences for wines consumed in professional entertainment.

The traits for some items in the database may be approximated if they have not actually been sensed and/or determined. For example, an expert who has not actually tasted a wine may enter trait values that the expert thinks are representative of similar wines. If so, when a consumer perceives and rates those wines, then when the system builds a preference profile for the consumer those wines may be given less emphasis than wines for which non-approximated or expert-determined trait values are available. This may be done by giving each wine for other item) a weight, such as a weight between 0 and 1. A weight of 1 may indicate that the system's wine experts are fully confident in their characterization of the wine. A weight of 0 may indicate no confidence. Weights between 0 and 1 may reflect varying degrees of confidence. These weights, or confidence values, may be accessed during the analysis of consumer-rated items. The calculations determining the presence of a dependence pattern may weigh the contribution of each item in proportion to its weight or confidence value in proportion to a weight assigned to the type of item information under consideration. Where there is more than one type of item information being analyzed and where their traits differ, then an overall weight may be determined for that item, such as a mean of the weights, minimum of the weights, or other functions.

In some embodiments, preference model discovery may be carried out in any or all of the following three stages: partitioning, analysis of dependence patterns and assembly of preference models. Partitioning may separate the items into various subsets whose inclusion criteria are based on item characteristics and/or contextual information. Analysis of dependence patterns considers each subset of rated items created by the partitioning process and identifies patterns of dependence indicating the different forms of preference. Assembly of preference models involves identifying the patterns of preference discovered by analysis and appending to them information that further describes the nature of the form of preference. This further information may include the item characteristics and/or context data supporting the pattern of rating dependence, the item characteristics and/or context data that determine which items qualify for inclusion in the subset of rated items that were analyzed, or the confidence or other metrics and statistical measures generated by the analysis. As described earlier, the first step may be applied because it will generally be the case that no single preference profile is applicable across all types of items or across all circumstances in which the items were sampled. Therefore, in addition to analyzing it in its entirety, the data set may be partitioned into various subsets that will be separately analyzed from each other. The third step adds the information required by the profile generation to satisfy criteria such as model certainty and salience.

In some embodiments, the identification of preference models may consider one or more subsets of the selected items and determine which of them exhibit specific patterns of association between the consumer-assigned ratings and the values of one or more item characteristics and context data. This may be done by partitioning the selected items into various subsets and then analyzing the various subsets of the selected wines generated by the partitioning process. The point of partitioning the selected wines is that it is unlikely that a single description of preference is applicable to all of the items perceived by the consumer. It is much more likely that the consumer will have different preferences for different types of items and/or in different circumstances of consumption. By partitioning the wines along, the lines of the individual traits and/or attributes and/or contexts, we may find and describe the preferences applicable to each of these types of wines and circumstances. For example, in the example of wines, the selected wines may be partitioned into four subsets according to the season of the year in which the wine was tasted. These subsets may again be partitioned according to the presence and absence of wood flavor in the wines. The types of items for which the user will have a exhibit a pattern of preference will generally not be known a priori. One approach to ensuring that the partitioning process includes such items of preference is to create item subsets on the basis of every conceivable combination of item characteristics and/or context data. A less exhaustive approach entails making assumptions about the types of items for which users will typically form patterns of preference, an approach requiring expertise in the domain of the items and what drives the preferences for those items.

In some embodiments, determining a pattern of dependency may include identifying one or more trending contrasting preferences for the person. Identifying a trending contrasting preference may include: (i) identifying a single item characteristic or a piece of ordinal or categorical rating context data associated with the ratings and by determining that the person's rating trends in concert with the item characteristic or context information; or (ii) identifying two or more item characteristics and/or rating context data and by determining that the item's rating trends in concert with some combination of intensities or values of the multiple sources of information. A rating may be considered to be trending if it exhibits a non-reversing upward or non-reversing downward trend in rating values as a function of the trait values.

Figure 5:
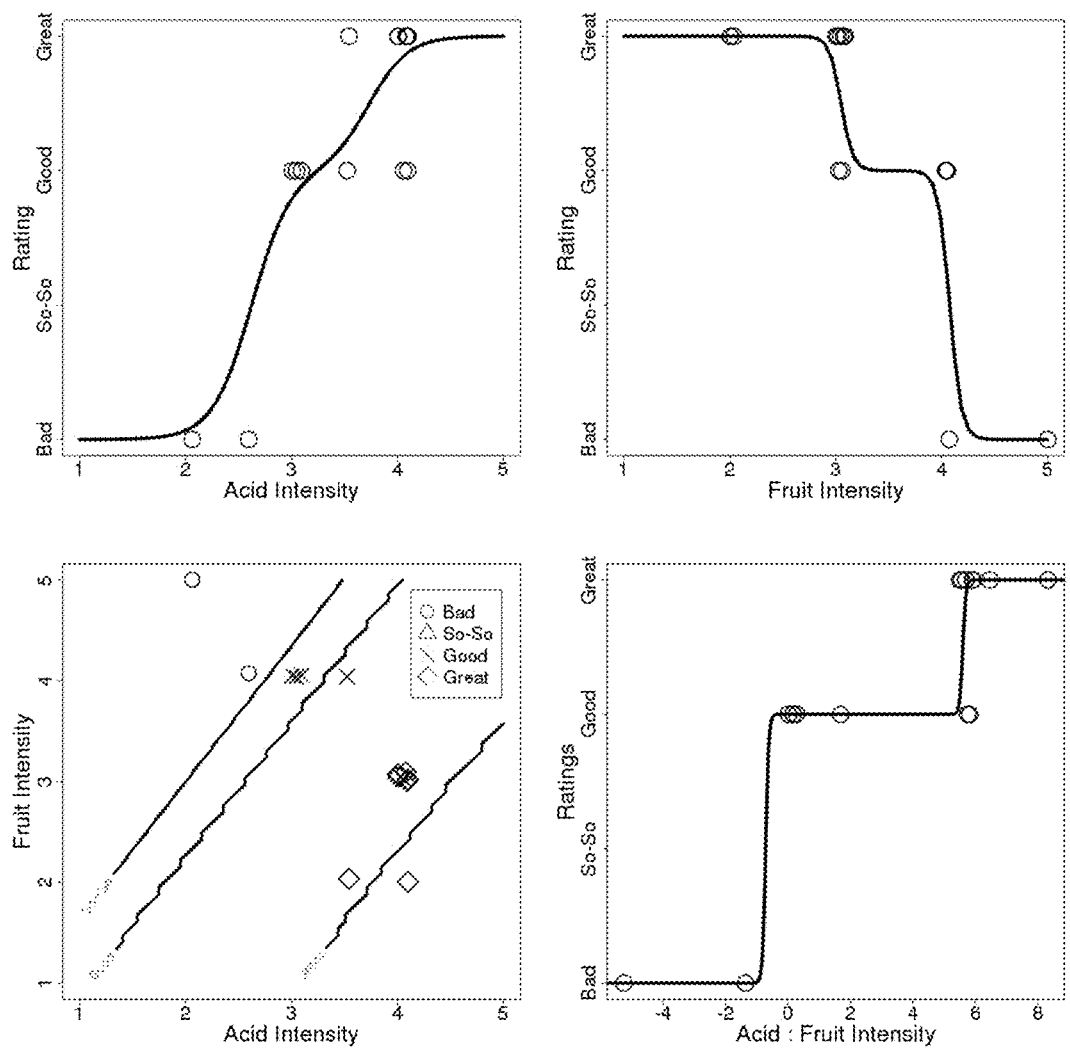
FIG. 5 is a graphic illustration of a trending type of contrasting preference.

An example of this for quantitatively valued data is shown in FIG. 5, which shows how a particular person's ratings for wines may increase as the wines' acid intensity trait increases, while the person's preference, as reflected by the rating values, may decrease as the wines' fruit intensity trait decreases. This data indicates that the person has a preference for wines that is driven by two different wine traits. One aspect of preference is driven by a dependence on acid intensity and the other on fruit intensity. This will manifest itself as the user's preference for wines that exhibit both a high acid intensity and a low fruit intensity and a preference against wines that exhibit both a low acid intensity and a high fruit intensity. Identifying a trending contrasting preference may also include: (i) identifying a single categorical or class valued item characteristic or context data associated with rated items by determining that the person's rating trends in concert with some ordering of the categorical values or classes; or (ii) identifying two or more item characteristics and/or context data associated with rated items by determining that the ratings trend in concert with some ordering of the Cartesian product of the categories and/or class values.

Figure 6:
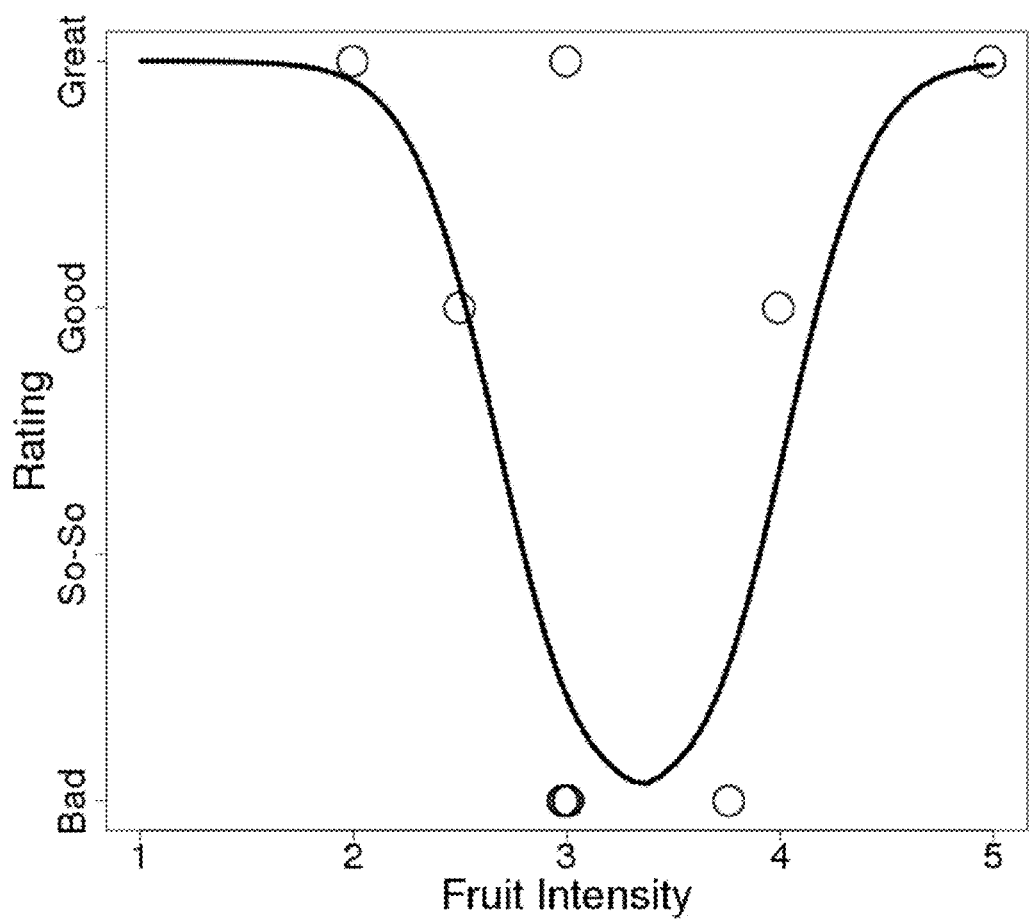
FIG. 6 is a graphic illustration of a focal type of contrasting preference.
Figure 9:
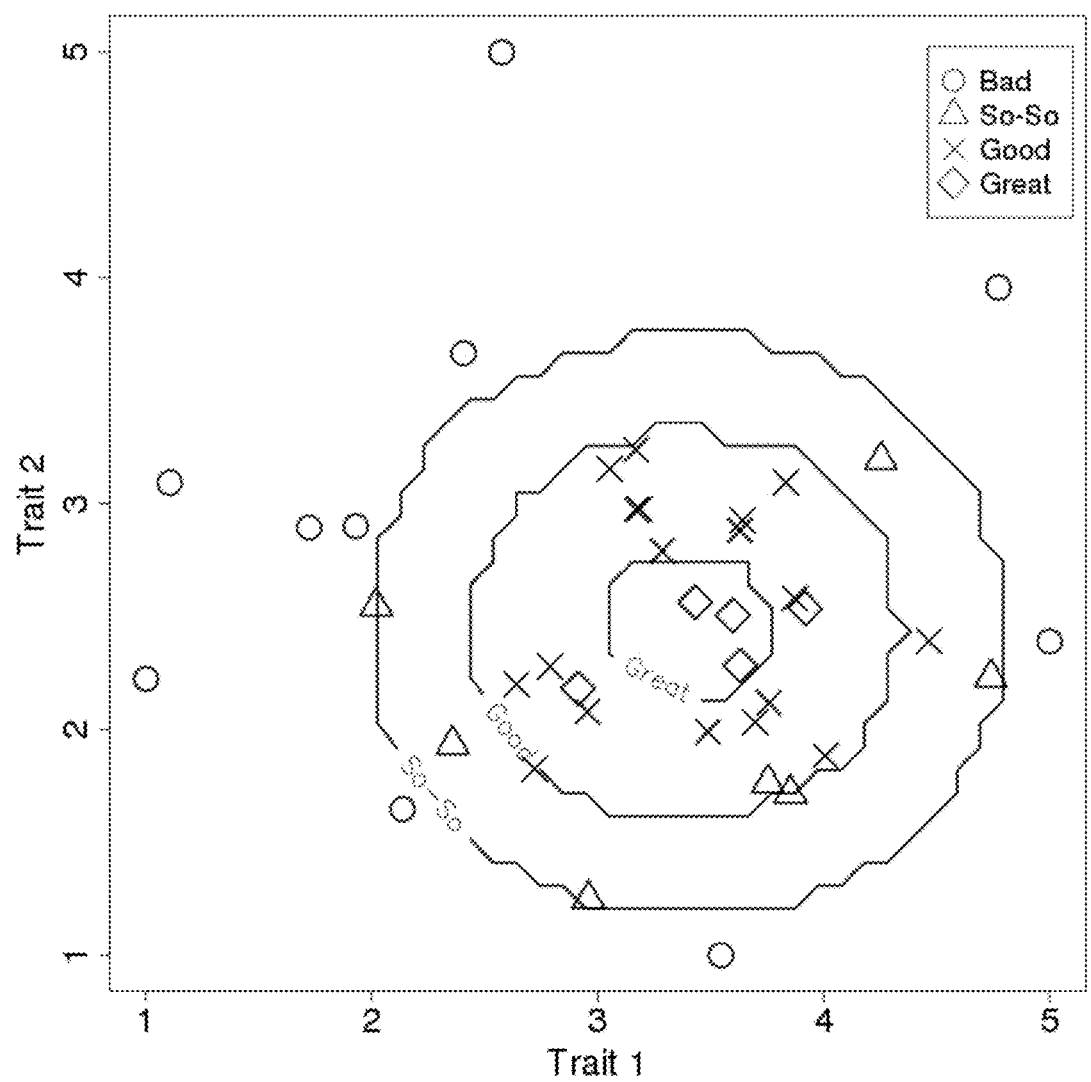
FIG. 9 shows an example of data indicating a focal contrasting preference based on two traits.

In other embodiments, identifying a pattern of dependency may include identifying one or more focal contrasting preferences for the user. Identifying a focal contrasting preference may include: (i) identifying an item characteristic or quantitative or ordinal piece of rating context data associated with a group of rated items for which the rating set includes both relatively maximal ratings and minimal ratings; (ii) determining that the person's ratings for the group of rated items includes a focal zone of maximal or minimal ratings representing positive or negative appeal over a circumscribed span of item characteristic or context data values. An example of this is shown in FIG. 6, which shows how a particular person's ratings for wines varied based on the wines' fruit intensity. Here, the person enjoyed wines having either a high or a low fruit intensity, but did not enjoy wines that were in the middle of the spectrum. Thus, the focal point in the middle of the spectrum indicates that the user expresses a negative preference to wines of only moderate fruit intensity, or a preference for wines with either high or low (but not moderate) fruit intensity. Identifying a focal contrasting preference may also include (i) identifying one or more item characteristics and/or context data associated with a group of rated items for which the rating set includes maximal and minimal ratings; (ii) determining that the ratings for the group of rated items include a focal zone of maximal or minimal values for a convex hull of values in the Cartesian product of the item characteristic and/or context data values. An example of this is shown in FIG. 9 where a closed, central region of values for the Cartesian product of the Trait 1 and Trait 2 values encompass of zone of maximal ratings.

In some embodiments, determining a pattern of dependency may include identifying one or more consistent preference patterns for the person. Identifying a consistent preference pattern may include: (i) determining the set of item trait, attribute, and/or rating context data values that were used by the partitioning process to identify the subset of items being considered; (ii) measuring a representative rating for the subset of items created by the partitioning process; (iii) measuring the extent to which the item ratings are dispersed around the representative rating, i.e. the rating homogeneity; (iv) determining, whether the rating homogeneity meets the criterion established for finding a consistent pattern of preference.

In some embodiments, determining a pattern of dependency may include identifying one or more polarizing preference patterns for the person. A polarizing preference model indicates that the person clearly exhibits a pattern of rating dependence, e.g. contrasting or Consistent, for some trait values to one side of a threshold value, but the person's feelings about other values for the trait are either unclear, as the user may have given both high and low ratings to items exhibiting that trait at values outside of the threshold value, or show a different pattern of dependence. An example is a person who consistently likes highly acidic wines, but who has an inconsistent range of opinions about low acidity wines.

Analysis Methods.

A goal of the analysis methods described in this document is to determine whether a given subset of items fits any of the previously defined patterns of dependencies between ratings and item characteristics and/or rating context data. In addition, results of the analysis methods may also provide predictions of the ratings as a function of item characteristics and/or context data and the verified pattern of dependence. Further, the analysis methods may also provide an estimate of the consequentiality of the item characteristic and/or context data values supporting the pattern of dependency. This is done by calculating the cumulative joint empirical probability of those data over the extremes of their values. The analysis methods may provide other information that may be of use to the preference profile assembly process. Therefore, the following will describe implementations that use widely understood analysis methods in order to portray how an embodiment may operate.

Every item subset created by the partitioning process undergoes all of the forms of analysis described in the following. These methods seek to discover how well the item ratings fit the previously defined patterns of dependence. Some of these methods examine the dependence between the item rating and selected item characteristics and/or context data. This dependence may be sought as a function of just one or two elements of item and/or context data, although in principle more than two elements of data may be examined. One reason for seeking rating dependence as a function of fewer than three elements of data is to preserve the usefulness of the human readable preference description since incorporating too many drivers of preference in it may be confusing. Which of the item characteristics and/or context data to consider as a driver of rating dependence will depend upon the nature of the items, how preferences for them are determined and decisions about how to implement the system. Some choices may be drive by the nature of the data, e.g. colinearity. In wine for example, one probably would not use the Body and Alcohol intensity traits when seeking rating dependence because these traits may track each other. One may expect to exclude the item characteristics and/or context data that were used to determine the subset of items under analysis and the selection of which of the rated items for which a profile is to be generated. This exclusion is due to the fact that such data may have constant values.

Contrasting Patterns of Dependence.

Referring, again to FIGS. 5 and 6, contrasting preference may be diagnosed here by 1) detecting a non-reversing upward or downward trend in ratings as a function of one or more item characteristics and/or rating context data (trending case) or 2) detecting a peaking or dipping trend in these variables (focal case). This may be done using a form of cumulative link model regression called ordered logit regression. (Other forms of tins approach, such as proportional hazards or ordered probit, could be more appropriate for other types of items.) The ordered logit model handles situations in which the response variable has an ordinal data type, e.g. an item rating. The model predictors can have quantitative, ordinal or categorical data types or a mixture of them. This regression method can therefore be more suitable for our application than linear regression because the latter presupposes a linear relationship between the levels of the response variable. Since the response variable is a rating, it cannot be assumed that its levels are linearly related, e.g. that the distance between the middle rating and the highest rating is the same as that between it and the lowest rating. This regression can also be more suitable for analyzing categorical data types than using measures of association such as Pearson's chi squared or Fisher's Test because these do not take into account the ordered nature of the ratings.

The following will illustrate a few examples of how the ordered logit regression can be used to detect signs of contrasting preference. The upper two plots of FIG. 5 give a graphical view of how wine ratings for an archetypical "acid freak" depend on the acidity and fruit intensity of the red wines tasted. The plotted circles show how the wine ratings (plotted vertically) varied as a function of the values of the wine trait (plotted horizontally). A little random jitter was added to the wine trait values so that the circles would not plot over each other. Overall the ratings increased with increasing acidity and decreased with increasing fruit intensity. The regression analysis sought to interpret these data as evidence for an upward or downward trend and plotted the predicted trend as a solid line running through and around the data points. The goodness of fit measures for both of these analyses were within the acceptable range with acidity being fit better than fruit intensity by two-thirds. Two trending preference models, parametrized by the regression procedure, were therefore produced indicating an increasing contrasting preference for acidity and a decreasing contrasting preference for fruitiness. This stage of analysis also looks for a pattern of preference as a function of combinations of item information. When the acidity and fruit intensity values were linearly combined, the regression fit a trending rating dependence pattern twice as well as when acidity was analyzed alone. The bottom left plot shows symbols representing ratings plotted at positions representing the values of the fruit intensity (vertical axis) and acidity (horizontal axis). The parallel diagonal lines are contours at each rating level that divide up this plot into regions that indicate the regression's prediction of how the user maps combinations of acidity and fruit intensity into ratings, it shows that the ratings increase in the upper-left to lower-right direction, indicating that the user prefers higher acidity while simultaneously tower fruit intensity. The lower right plot shows a narrower, but more easily interpreted view of the regression results. Here the ratings are plotted versus a linear combination of the acidity and the fruit intensity. The solid line shows the rating prediction made by the regression as a function of this combination of wine traits and it is a much tighter fit to the data than the single trait model.

FIG. 5 portrays an instance of preferences that can be described with different degrees of specificity. A compact, less specific, way of describing the driver of this person's preference is that he or she prefers high acidity to low acidity. The preference running against fruit intensity is less accurately defined, and so could be a secondary finding. A more accurate but less compact, more specific, description of preference includes the additional effect of fruit intensity. If desired, both assessments may be made available to the user, and this presentation may include displaying the assessments in order of prominence. Since acid intensity and fruit intensity strongly and negatively co-vary in the sample of wines tasted, it is natural to assume that the preference against fruitiness is driven by the stronger preference for acidity. However, since there is a stronger preference model fit from the combination of fruit intensity and acid intensity, it suggests that the fruit intensity is an independent driver of preference and carries additional information.

A goal of looking for a trending contrasting pattern of dependence may be to be able to say that a person's taste runs along with the degree of expression and/or presence of particular things about the item itself and/or the circumstances of the consumer's perception of that item. Informally described, a trending contrasting pattern of dependence is a case where the ratings trend with the monotonic, i.e. single direction, expression of an item characteristic and/or piece of context data. Examples applicable to wine are that the consumer likes more over less tannin, or likes the presence of woody flavors and dislikes the absence of these flavors. There can be a case where ratings show a statistically detectable increase in preference with increasing tannin intensity, where tannin intensity is a type of item information that has an ordered data type. It can also be a case where ratings for wines having a woody flavor are statistically higher than the ratings of those wines that don't, where woody flavor is a type of item information that has a categorical data type. It can also be the case where ratings change as a function of both tannin intensity and the presence of a woody flavor, thus depending multiple types of data.

More formally described, a trending contrasting pattern of dependence is manifested by a verifiable association between the item ratings and the monotonic progression of the values of item characteristics and/or context data, whether there are single or multiple types of information having ordered or categorical data types, or a mixture of both. Such verification may be made by means of statistical analysis. This pattern of dependence may be discovered by finding that the p-value of a statistical analysis falls below a given threshold value. The p-value is the probability that the pattern of dependence arose by chance. Therefore our confidence in the discovery of a pattern of dependence goes up as the p-value goes down. Optionally, the system may use a 0.1 p-value threshold so that there is a 90% chance that the discovered pattern of dependence is not spurious.

Figure 8:
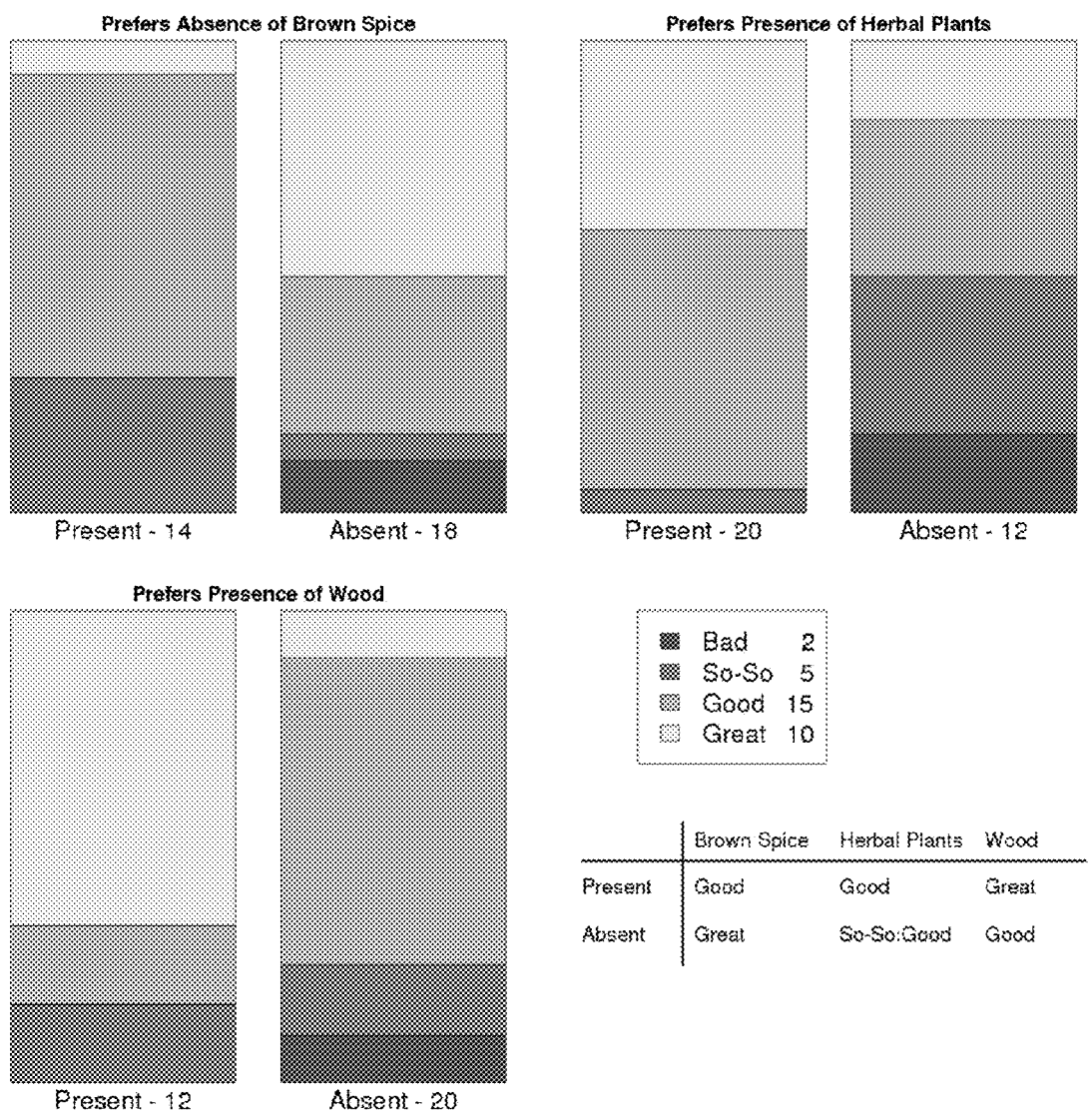
FIG. 8 illustrates contrasting associations between ratings and item traits with a qualitative data type.

The portrayal of analyses based on item characteristics having ordinal data types is very much the same as the above examples using quantitative data types and so a separate illustration is not provided. The portrayal of categorical item characteristics, while also conducted using ordered logit regression, differs in character from that using quantitative or ordinal data. For example FIG. 8 uses bar plots to show the associations between ratings and the categorical wine traits depicting three types of wine flavor, "Brown Spice", "Herbal Plants" and "Wood," for a person who rated 32 red wines. The effect of each type of flavor was analyzed separately. The presence and absence of a flavor was coded as a 1 and 0 respectively and this information, along with the corresponding ratings, was entered into the regression. The regression showed whether there was a statistically significant upward or downward shift in the ratings as a function of the flavor and also indicated the direction of dependence. In FIG. 8, three sets of a pair of stacked bar charts show the proportion of the wines receiving each rating for the cases in which a flavor trait was present and for the cases in which it was absent (the underlying labels show the number of wines for each case). The sizes and shadings of the various sub-portions of the bar charts pot lay the relative proportions of the ratings in each instance. Overall, this person thought that 25 of the 32 wines were good or great (see tally in the legend box) and so there is only a small margin for detecting preferences. Nevertheless ifs possible to notice shifts in ratings in the plots according to the presence of flavors and the regressions reported highly statistically significant associations between the presence or absence of these flavors and an upward or downward shift in ratings.

In FIG. 8, the title above each pair of bar charts shows the preference conclusions drawn from these analyses. When Brown Spice was absent there was an upward shift in the overall pattern of ratings. The table in the lower right corner of FIG. 8 shows that the predominant rating went up from Good to Great when this flavor was absent. When Herbal Plant flavor was present the predominant rating went from somewhere between So-So and Good up to Good. Likewise, when Wood flavor was present the ratings shifted from predominantly Good to Great. Interestingly, the effect of each flavor on the ratings was independent of the other flavors. This is because when the regression was performed on pairs of flavors, or on all three flavors at once, each flavor retained a statistically significant ability to shift the pattern of ratings. At the margin, this person prefers wines with Wood and Herbal Plant flavors and without Brown Spice flavors, both individually and together in various combinations. This driver of preference, however, exerts an important effect, shifting the ratings on the order of magnitude of a single step.

In instances where a categorical variable is able to take on more than two values, e.g. left/middle/right, a trending form of contrasting preference may be identified. A non-reversing progression in the ratings that is a function of a specific ordering of the categorical values indicates a contrasting preference. In practice this form of dependence may be detected by an ordered logit regression on the categorical values wherein the estimated coefficients for these trait values are statistically distinct from each other.

An example of a focal variety of a contrasting preference model, fit for a person tasting white wine, is shown by FIG. 6. Ordered logit regressions look for non-reversing trends, so in order to fit the focal variety, the data was transformed by assuming a center value for the fruit intensity, initially the median was chosen. Then the absolute distances of the fruit values from that center point was fed into the ordered logit regression. As a result, the regression saw trait values that increased from the center point and thus to peaking pattern would appear as an increasing trend. Conversely, a dipping pattern would appear as a decreasing, trend. Since the initial guess at the center may not be the best choice, this center value was also optimized along with the other parameters of the regression. The best fit circles indicate where the ratings fell (vertical axis) as a function of the wine fruitiness (horizontal axis). The regression analysis found evidence for a downward dipping, pattern of preference and the corresponding predictions of ratings as a function of fruit intensity for such a model are traced by the solid line. It passes through nearly all but one of the eight plotted points. Because of that one outlying data point this fit is almost at the outer limit of acceptability. This quality of fit will be taken into account, such as in later procedures responsible for prose generation. Such a preference model indicates that mid-range levels of fruit intensity are preferred much less than lower or higher ones. It was earlier shown that a trending preference could be found for the linear combination of two wine traits. The same can be done in searching for focal contrasting preference models. In such a case the linear combination of trait values would be formed before their distances from a center point are calculated. Fitting such a model would indicate that there is a combination of trait values that is preferred or not preferred, somewhere away from the largest and smallest values for that trait combination.

There is another case of a focal variety of contrasting preference involving two wine traits that is different from the last illustration. FIG. 9 demonstrates this example. In this case ratings, represented by four different symbols, are plotted at the horizontal and vertical positions given by the each of the two sets of trait values. The highest ratings are clustered at the center of the plot area, the lowest ratings appear around its periphery and intermediate rating values concentrically fill in the intervening regions. The regression predicted ratings at all points in the plot area in a way that best fit the set of data. The roughly circular contours enclose the regions predicted to have each rating value. Given the good quality of fit found here, such a data set would be taken as evidence for a contrasting preference model of the "bulls-eye" variety. In this case of wine, it indicates that there is a preference "sweet spot" for wine traits having a range of values that put it within the innermost contour of high ratings.

One may look for a focal contrasting pattern of dependence in order to be able to say that a person's preferences are driven along the distance from a circumscribed, range in the degree of expression of particular item characteristics and/or its rating context. Informally described, a focal contrasting pattern of dependence may be a case where the ratings monotonically trend with distance from a circumscribed range in the values portraying the expression of an item characteristics. As an example, this can be a case where ratings show a verifiable progression in values with increasing distance from a circumscribed range of tannin intensity values. Such verification lay be made by means of statistical analysis. Formally described, a focal contrasting pattern of dependence may be manifested by a statistically detectable association between item ratings and a monotonic progression in the values of single or multiple item characteristics and/or context data having ordered data types away from a circumscribed range of values. This pattern of dependence may be discovered by finding that the p-value of the analysis falls below a given threshold value. The p-value is the probability that the pattern of dependence arose by chance. Therefore our confidence in the discovery of a pattern of dependence goes up as the p-value goes down. Optionally, we may use a 0.1 p-value threshold so that there is a 90% chance that the discovered pattern of dependence is not spurious.

Consistent Patterns of Dependence.

A goal of looking for a consistent pattern of dependence is to be able to identify cases where a given combination of item characteristics and/or rating context data used to form the subset of items under analysis elicit a consistent response from the user. An example of this pattern of preference include one where a user usually dislikes wines having a barnyard aroma. Informally described, a consistent pattern of dependence is a case where the user's ratings for a subset of items tend to cluster around a single value. In such cases, the item characteristic and/or context data values used in the partitioning process to form the item subset characterize the preference. For example, when looking at a subset of selected white wines consisting of only those tasted during the winter months, finding that this partitioning yielded consistently mediocre ratings, would characterize a consistent pattern of dependence. In other words, the user is apparently not crazy about white wines during the winter. More formally described, a consistent pattern of dependence may be manifested by finding that ratings evidence a degree of statistical dispersion, e.g. standard deviation or mean absolute deviation, sufficiently low so as to be taken as effectively constant. This pattern of dependence may be discovered by finding that the measure of statistical dispersion of ratings falls below a given threshold value. The smaller the degree of statistical dispersion, then the greater confidence that the ratings are effectively constant.

Polarizing Patterns of Dependence.

One may look for a polarizing pattern of dependence in order to be able to identify cases where a combination of item characteristics and/or rating context results in one type of rating dependence being found but situations outside of that combination results in a different type of rating dependence being found or no pattern of rating dependence being found. Of specific interest are instances of polarizing dependence that are manifested by finding a consistent pattern of rating dependence in conjunction with no defined pattern of rating dependence. An example of this is demonstrated where the user usually dislikes sweet wines but has a range of opinions, i.e. an undefined pattern of rating dependence, for non-sweet wines. Finding such a polarizing pattern of dependence entails describing the boundaries within which appeal is defined. Informally described, such a polarizing pattern of dependence may occupy the ground between a contrasting pattern of dependence and a consistent pattern of dependence. As with a contrasting pattern of dependence, the system may consider a range of ratings within the subset of items. However, the relationship is not defined over the entire range of values taken on by the set of item information defining that pattern of dependence. However, like the consistent pattern of dependence, the ratings are defined and effectively constant. However this constancy only exists within a certain range of values taken on by the set of item characteristics defining that pattern of dependence and not across the entire subset of wines. More formally described: (i) for item characteristics and/or context data having, quantitative or ordinal data types, such a polarizing pattern of dependence may be found when a threshold can be found for the data values defining the relation and (ii) for item characteristics and/or context data having categorical data types a polarizing pattern of dependence is found when a trigger value can be found for the data defining the relation. In the case of quantitative or ordinal data, the ratings of wines having characteristics values to one side of the threshold are effectively constant and the ratings of the remaining wines are not constant. In the case of categorical data, the ratings of wines having characteristic values equal to that of the trigger value are effectively constant and the ratings of the remaining wines are not constant. In cases where the item characteristics and/or context data have mixed data types the threshold and trigger conditions are separately applied, to each item characteristic and/or context datum and the wines that satisfy both of them may be seen to have effectively constant ratings while the remaining ones do not. Determining when ratings are effectively constant is done by finding a sufficiently low degree of statistical dispersion as, for instance, may be done to identify a consistent pattern of dependence. This pattern of dependence may be discovered by finding the measure of statistical dispersion of the ratings for wines satisfying the threshold and/or trigger criteria falling below a given threshold value and that the statistical dispersion of the ratings for the remaining wines lie above another given threshold value. The smaller the degree of statistical dispersion in the former, then the greater the confidence that the ratings are effectively constant. The larger the degree of statistical dispersion in the latter the greater the confidence that the ratings are undefined.

The preceding describes the primary form of polarizing preference sought out by this analysis, in full generality, the polarizing pattern of dependence can be described as a circumstance where there is a certain value(s) for an item characteristic(s) and/or context data that serves to divide the subset of wines into two parts: a pan where one specific pattern of dependence is recognized and a part where another or no recognizable pattern of dependence is found. The example described above embodies the case of a consistent pattern of preference paired with no pattern of preference. Other possibilities include a contrasting pattern of preference paired with no pattern of preference and a consistent pattern of preference paired with a contrasting pattern of preference.

Example of Analysis Based on Class Data Types

While rating, dependency patterns may be sought as a function of any arbitrary collection of classes, particularly useful results may be obtained when such classes are restricted to having defined hierarchical relationships. The class hierarchy used may be all, or a subset, of one constructed for all items or a selection of items, e.g. the hierarchy constructed on a portion of the red wine style base classes shown in FIG. 7. A pre-specified hierarchy may be used and/or one contingently constructed at the time of analysis on the basis of item characteristics and/or user context data. One may analyze the rating dependence patterns of items assigned to a given class and consider only that class and the ancestors to that, class as potential data against which rating dependence is sought. That is, take as drivers of the rating dependence patterns either; (i) the class under consideration as a whole; or (ii) the items directly assigned to the class and the items that are also members of the lower level classes that combine the form that class. As was done with quantitative and ordinal traits, contrasting, preference across classes may be assessed by ordered logit regression. Similarly, as in its application to the analysis of other types of categorical, data, the regression here may weight the data by the similarity of the items to the class under analysis. A regression is performed on subsets of the class Members according to each of the multiple ways they can constitute the class under consideration.

In one embodiment, e.g. where higher level classes are formed by the pairwise merger of lower level classes, four analyses may be performed: all three class components are compared against each other at once, the two immediate sub-classes are compared to each other, and the subset of directly assigned items is separately compared against each of the immediate sub-classes of items. The sign and value of the parameters returned by the regression may be interpreted to determine the direction and relative strength of preference. The statistical significance of the regression may be determined by likelihood ratio test statistics. A contrasting preference may be diagnosed if there is sufficient statistical significance. Consistent preference may be assessed using all items comprising the subject class. This determination may be made by measuring homogeneity in the ratings, such as can be derived from the class similarity measures and the ratings. This measure indicates how closely the ratings tend to cluster around a predominant value and how closely similar the rated items are to the class. A sufficiently high homogeneity in ratings indicates that the class members are effectively equally preferred and thus well identified with the class. A threshold value is used to denote homogeneity sufficiently high to indicate consistent preference for the class. The homogeneity measure may be any suitable measure.

A polarizing preference of the consistent/no pattern form may be assessed in three combinations of the subsets of items that may comprise the class: the subset of items directly assigned to the class versus each of the two immediate sub-classes of the subject class and these two sub-classes against each other. One way to detect the primary form of polarizing preference is to compare the ratings homogeneity of each subset of items. A polarizing preference is identified when one of these subsets has homogeneous ratings and the other does not. The latter determination is made when the homogeneity of the former meets or exceeds a threshold, and the homogeneity of the latter is equal to or less than a lower threshold. Other methods have been used to make this determination but their description was deferred in favor of this simpler technique.

Figure 10:
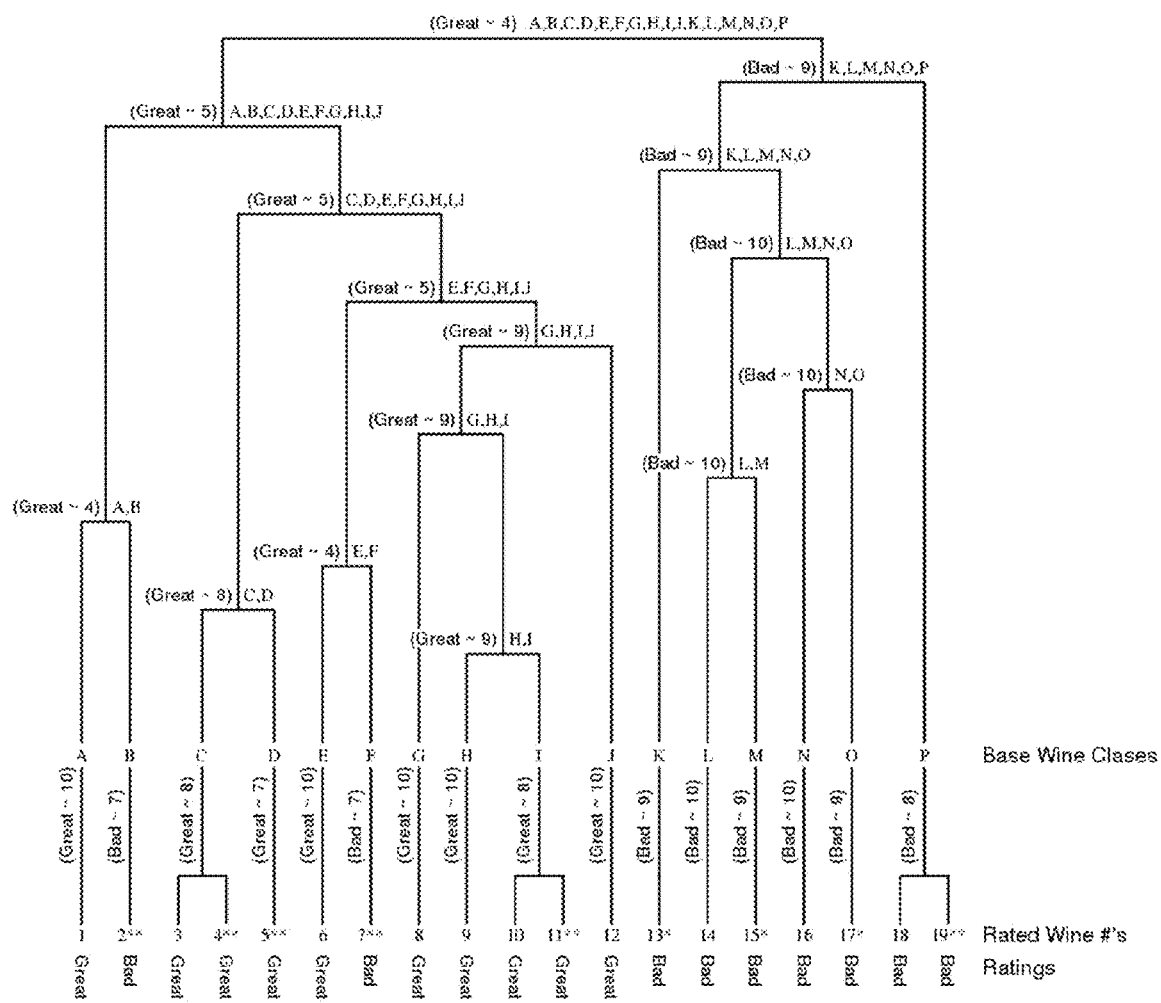
FIG. 10 is a hierarchy of classes illustrating a user's preference of various classes of items

An example of analysis according to class descriptors is portrayed by FIG. 10 where the hierarchy corresponding, to the classes associated with the rated wines is depicted along with other information. In order to simplify this presentation the class assignments of rated wines 2, 4, 5, 7, 15 and 19 were altered. Normally they would be assigned to classes at higher levels of the hierarchy but they were instead assigned to the base classes to which they were the most similar and their similarity values were adjusted accordingly. If this were not done then the diagram would show these wines and their ratings attached to various levels of the hierarchy. In this sample data set, the wines and ratings typify a person who loves plush, fruit forward, new world red wines but hates astringency. Nineteen wines were rated and their numbers and ratings run along the bottom margin of the diagram. The base classes to which these wines were assigned run in a row above them and are identified by the letters A through P. Vertical lines indicate the assignment of rated wines to their classes and their similarity to them depicted by asterisk superscripts—no asterisk reflects a similarity value that equates to "most similar", one asterisk reflects a similarity value that equates to "pretty similar" and two asterisks reflects a similarity value that equates to "somewhat similar." The composition of the higher level classes is depicted at each hierarchy level by listing the letters for each contained base class. These letters also serve as the class trait name. Thus the top of the diagram shows all of the letters together in one class and the bottom of the diagram shows single letters with each base class.

In addition to the class composition, each hierarchy level in FIG. 10 shows in parentheses the class rating and rating homogeneity. For clarity the homogeneity value was multiplied by ten and rounded to a single digit, e.g. a homogeneity of 1.0 corresponds to 10 in the diagram. Finally, the ratings and homogeneities of the base classes are shown vertically oriented, parenthetical labels below them. To compensate for changing the class assignments, the class similarity levels at the base class level were carried through to all of the rating homogeneity calculations instead of using the similarity values appropriate to each level.

Analysis begins at the top level of FIG. 10, where a strong contrasting preference is found to favor the left class subset (A, B, . . . , J) over the right class subset (K, L, . . . , P). The left branch of the hierarchy is rated as Great, albeit with not much rating homogeneity, and the right branch is rated Bad with a high rating homogeneity. A description of the right class subset would reflect that the subset comprises nearly entirely Old World wines, modest in fruit and that the astringent wines of the world are concentrated within it. A description of the left class subset would reflect that the subset comprises primarily New World wines, bountiful in fruit and largely lacking an astringent character. Prose generated on the basis of these descriptions would match the stated preferences actually underlying this data set. This prose would more accurately describe what is not preferred than what is preferred since the rating homogeneity of the left branch class is lower than that of the right branch class. The rating homogeneity values (5 and 9) for these two subsets fails to satisfy the conditions for finding a polarizing preference, but if it did, its diagnosis would be preempted by the higher salience of the contrasting preference found for the same subsets. Because the rating homogeneity is below 7 it is also clear that there is no consistent preference for the class representing the combination of these classes.

The classes comprising the right branch of this hierarchy all show strong evidence of consistent preferences against their classes. The situation is mixed for the classes comprising the left branch of the hierarchy. The six classes that contained wines 2 or 7 generally had middle to low values of rating homogeneity. That prevented, finding consistent preferences in those classes, although in two of them there were trivial cases of contrasting preference involving only two wines. The four classes that didn't contain wines 2 and 7 showed consistent preferences because of their high ratings homogeneity.

Assembly of Preference Models.

Preference models may be assembled from each of the patterns of preference, i.e. patterns of rating dependence, discovered during the analysis of the subsets of selected items. In some embodiments, the assembly of preference model may include any or all of the following steps: (i) identify a pattern of dependence that was discovered; (ii) identify the types of item information defining the pattern of dependence; (iii) capture how the analysis method characterized the pattern of dependence (e.g., p-value, rating dispersion, etc.); (iv) identify the values and types of item characteristics and rating context data that were used to define the subset of selected wines that were analyzed; and (v) identify the values and types of item characteristics and/or context data that were used to select from all of the items that were rated by the user to create the preference profile.

Other types of information about the pattern of dependence that may be needed by subsequent stages of processing can be added to this collection.

Assembly of Preference Profiles from Preference Models.

The stage comprising the discovery of preference models can return of a variety of results. The preference models will have a variety of rating dependence patterns that are discovered with varied degrees of model fit, explainability and consequentiality. These preference models will also vary as to the number of simultaneously analyzed types of item information and will encompass subsets containing a variety of different selected wines. Only those models whose fitness metrics indicate that a preference pattern has been identified with sufficient certainty are used for preference profiles.

It may be desired to generate multiple preference profiles for a consumer having a range in the generality with which the consumer describes drivers of preferences. For example, a person may find it more useful to have a short, simple, low specificity explanation of his drivers of preferences, even if the short description does not have high collective coverage, informativeness, explainability and consequentiality, while also having low specificity and multiplicity. Such a preference profile can be created by constraining the assembly of preference models to be a subset of those items that cover all of the selected items. On the other band, another person may desire a long, specific, complex explanation of their drivers of preferences, even if it has high collective multiplicity. Such a preference profile can be created by constraining the assembly of preference models to be a set of those that cover most or all of the selected items. It may be desirable to generate a series of preference profiles that cover the range of preference descriptions between these two extremes so that the user has the option to learn their preferences in as much detail as they desire.

For the purpose of the discussion of the previous paragraph, coverage is a measure of the fraction of the selected items that appear in at least one of the partitions of the assembled preference models. Uniqueness is a measure of the fraction of the selected items that appear in no more than one of the partitions of the assembled preference models. The informativeness of a preference model proceeds from most to least with the following ordering of their underlying pattern of dependence: trending contrasting, focal contrasting, consistent and polarizing. Multiplicity is the total number of preference models comprising the preference profile. Consequentiality applies to item characteristics and context data and describes cumulative empirical probability of encountering the range of values associated with the subset of items associated with the preference model in the user's world. If that probability is high then the model is highly consequential.

Changing Preference Profiles with the Addition of New Ratings

Several approaches may be taken with respect to changing a user's preference profile as the user adds item ratings to the database. One approach is to generate the user's profile anew after the user updates their rating history with one or more item ratings. Another approach is to delay generating the user's profile anew until some criteria is met, e.g. when a minimum number of items rated. A third approach is to adopt the less computationally intensive method of updating only the profile models without partitioning the rated, items and discovering preference models anew. The first part of this third approach, called updating, requires identifying the preference models associated with the newly rated items. That is, going through the item characteristics and rating context values used to create the subsets of items associated with the preference models and determining whether the item characteristics and context data for the newly rated item qualifies it for inclusion in the subset. The identified preference models are updated by analyzing, the data set comprised of the previous items and the newly rated item. The updated results and performance metrics are passed along to the affected preference profiles and the human readable portrayal of the profiles are updated with the new results. Limits may be imposed on the use of the updating method. For instance, as in the second approach, a profile update may be overridden and a profile generated anew if certain criteria are met, e.g., a given number of newly rated wines since the last profile generation. Another reason to generate a profile anew is if the performance metrics of the updated models sufficiently degrade since this is a possible sign that the items need to be partitioned anew.

Improving Preference Profiles and/or Individual Preference Models by Suggesting Additional Items to Rate The process of suggestion generation may be illustrated using a preference model characterized by a consistent preference rating dependency pattern. This pattern describes a state wherein items were assigned a narrow range of ratings by the user. Among the metrics and flags that the system may consider include a measure of the effective number of items supporting the finding (experience score), a measure of the spread of the item ratings around the model prediction (model fit) a measure of the sureness with which the items identify with the item description (subset similarity) and a flag (outlier indicator indicating) which of the items can be considered to have an outlying rating. In order for a preference model construction, the system may require sufficient experience score, model fit and subset similarity. This last proviso can apply to item subsets created on the basis of item being members of specific classes wherein the assignment of an item to a class is accompanied by a strength of association measure, i.e. the identification of the item to the class. Preference profiles also may require the identification of items whose ratings make them outliers with respect to the preference model.

Each of the above metrics and flags can be used as a basis on which to generate item suggestions. For example, in the context of an experience score, the system may determine a user's experience score as a function of the number of rated items in the preference model. This may be a raw number equal to the number of rated items, a percentage of a target number of rated items, or some other function. If the experience score for the items in the subset associated with the preference model is below a threshold, then the system may determine that strength of this model can be bolstered if the user is directed to experience and rate more items that fit the item description associated with the preference model. The system may then access the database of candidate items and identify an item that, if rated, would improve the user's experience score for that preference model. It may then suggest that the use experience and rate that item. This will increase the number of effective items associated with the preference model if there is a below threshold or marginal value in the subset similarity of the rated items with the item subset description.

By having the user experience and rate items that match the item description used to construct the item subset, the system can expect to increase the similarity of the items to the definition of the subset for that preference model. If it is assumed that a user will rate similarly identified items in a similar way, then we can expect to improve the model it by suggesting items fitting the item subset description. In this instance, a more sophisticated approach is possible wherein a deeper pattern of rating dependence can be sought, and the results used, to create a more targeted item description from which to suggest items to try. Similarly, when outlying item ratings are flagged, it is possible to determine whether such ratings are flukes by creating, item descriptions more closely identified with the flagged items than the item description used by the model. The ratings for items suggested on the basis of such a narrower item description may or may not be consistent with the outlying rating and so indicate whether chance or other reason was the cause of the outlying rating or an insufficiently specific preference model.

The following describes other ways in which the preference profile can be improved by suggesting additional items to rate. A contrasting pattern of rating dependence is characterized by specific forms of rating trends as a function of item characteristics or by a contingent difference in ratings as a function of categorical item characteristics. The methods used to detect a contrasting pattern of rating dependence may include any of a variety of regression, contingency and statistical testing techniques. Therefore, their metrics may include, among others, measures of association, leverage and hypothesis exclusion probabilities. For example, if a preference model of the contrasting type indicates that a range of item information values exerts high leverage in a regression analysis, then an item description can be generated that corresponds to the regime of item characteristic values for which rating data are lacking. Obtaining the ratings for suggested items that satisfy such a description may reduce leverage in the regression analysis and so increase the accuracy of its findings. Also, if a contingency test reveals that cells associated with certain item information values are underpopulated relative to other cells, then suggestions can be generated on the basis of item descriptions pertaining specifically to such cells. Having the ratings for such items will increase the statistical confidence in the conclusions reached by a contingency test and so bolster the preference model. Suggestions can be used to deal with a case where there is no support for a univariate dependence of ratings on item information but for which the range in values for other variates is too small to support a multivariate analysis. Suggestions can be generated on the basis of a description of items possessing a wider range of values than possessed by the variates that currently span too small of a range of values.

As the preceding illustrates, the methods used for suggestion generation may depend on the preference model and its performance metrics. The suggestion generator may be triggered by preference descriptions whose performance metrics are indicative of sub-par or marginally acceptable values. The specific details of such methods may depend upon identifying the means by which item ratings and item information interact to give rise to "better" or "worse" values of the performance metrics and working backwards to determine the values of item information that are required in order to hope to see those metrics improved. This process may depend upon the particular implementation of the recommendation system.

Translation of Preference Profiles into Prose Preference Descriptions.

The system may report some or all of a person's preference profile by way of prose. To do this, a series of rules would be used to generate the prose that reflect the patterns of preference and translate those results into consumer-understandable phrases.

Figure 12:
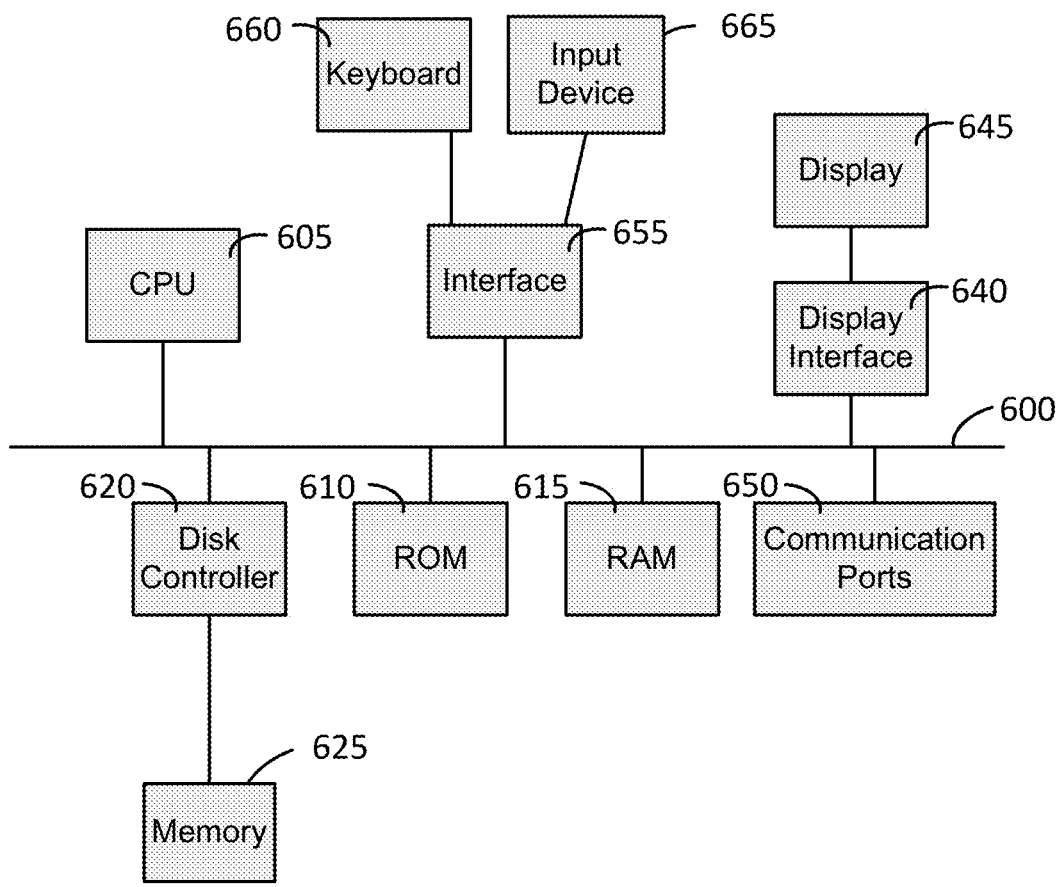
FIG. 12 is a block diagram of internal computer hardware that may be used to contain or implement program instructions according to an embodiment.

FIG. 12 depicts a block diagram of an example of internal hardware that may be used to contain or implement program instructions, such as the process steps discussed above in reference to FIG. 2, according to embodiments. A bus 600 serves as an information highway interconnecting the other illustrated components of the hardware. CPU 605 is the central processing unit of the system, performing calculations and logic operations required to execute a program. CPU 605, alone or in conjunction with one or more of the other elements disclosed in FIG. 12, is an example of a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying, or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. Communication with external devices, such as a printing device, may occur using various communication ports 650. An exemplary communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of assessing a person's personal taste, comprising:
   causing an electronic device to output a user interface to a person;
   receiving, via the user interface, a rating set comprising the person's ratings for each of a plurality of rated consumable items, wherein at least a portion of the received ratings comprise item ratings rather than ratings of item characteristics; and
   by one or more processors, developing a preference model for the person based on the received ratings by:
      accessing a database comprising values of characteristics for a plurality of candidate consumable items,
      identifying the candidate consumable items in the database that correspond to the rated consumable items,
      using the received item ratings and the values of characteristics for the candidate consumable items in the database that correspond to the rated consumable items to determine the preference model.

2. The method of claim 1, wherein using the received item ratings and the values of characteristics for the candidate consumable items in the database that correspond to the rated consumable items to determine the preference model comprises:
retrieving, from the database, a value for at least one characteristic for each of the candidate consumable items that corresponds to characteristics of the rated consumable items;
identifying at least one pattern of dependency between at least one of the retrieved characteristic values and at least one of the received item ratings; and
determining the preference model, based on the at least one pattern of dependency.

3. The method of claim 1, further comprising:
receiving a request for a recommendation of a consumable item, wherein the request comprises one or more criteria that the recommendation must satisfy;
accessing a database comprising characteristic values for a plurality of candidate consumable items and, based on the one or more criteria, the preference model and the characteristic values, selecting a candidate item for the recommendation; and
providing, via the user interface, the recommendation for the selected candidate item.

4. The method of claim 1, wherein, for at least one of the rated consumable items, identifying the candidate consumable items in the database that correspond to the rated consumable items comprises:
determining whether data for the rated consumable item is available in the database; and
if so, retrieving one or more values of characteristics of the rated consumable item.

5. The method of claim 1, further comprising using the preference model to develop a preference profile for the person.

6. The method of claim 1, wherein determining the preference model further comprises:
receiving a context for the person's experience of one or more of the rated consumable items; and
also using the context to determine the preference model.

7. The method of claim 4, wherein identifying at least one of the patterns of dependency comprises one or more of the following:
identifying a focal contrasting pattern associated with a group of the rated consumable items by analyzing relative differences in ratings for the group of rated consumable items as a function of the group of consumable items' traits by determining that the person's ratings for the group of rated consumable items include a focal point of positive or negative appeal;
identifying a polarizing preference pattern for which the person has expressed different patterns of rating for one or more trait values;
identifying a trending trait for which there is a non-reversing upward or a non-reversing downward trend in rating values as a function of the trait values; or
identifying a consistent trait for which the person's ratings exhibit a degree of dispersion such as that they are effectively constant.

8. The method of claim 1, further comprising:
accessing the database to identify at least one candidate consumable item that exhibits one or more characteristics that, if the identified candidate consumable item is rated by the person, will improve the preference model or a preference profile for the person; and
generating a suggestion that the person rate the identified candidate consumable item.

9. The method of claim 1, further comprising:
generating an experience score for the preference model so that the experience score comprises a function of the rated consumable items in the preference model;
determining that the experience score is below a threshold;
accessing the database to identify at least one consumable item that exhibits characteristics that, if the consumable item is rated by the person, will improve the person's preference model or a preference profile for the person; and
generating a suggestion that the person rate the identified consumable item.

10. The method of claim 1, further comprising:
identifying a subset of the rated consumable items;
determining that the preference model indicates a conflict between preference indicators for one or more characteristics of the rated consumable items in the subset;
accessing the database to identify at least one additional consumable item that exhibits characteristics that, if the additional consumable item is rated by the person, will resolve the conflict; and
generating a suggestion that the person rate the identified additional consumable item.

11. The method of claim 1, further comprising:
receiving identifying information about a non-rated consumable item;
using the identifying information to access the database and determine whether the non-rated consumable item is in the database; and
if so:
identifying one or more characteristics of the non-rated consumable item,
determining whether the identified characteristics of the non-rated consumable item correspond to one or more indicators of preference in the preference model or a preference profile for the person; and
based on whether the identified characteristics of the non-rated consumable item correspond to one or more indicators of preference, generating a prediction of whether the person is likely to exhibit a preference for the non-rated consumable item.

12. The method of claim 5, further comprising:
accessing a second person's preference profile;
determining that the second person's preference profile includes a second person preference model that is similar to the determined preference model; and
adding the second person's preference model to the developed preference profile.

13. The method of claim 5, further comprising:
accessing the database to identify at least one consumable item that the person is expected to like based on the person's preference profile;
accessing a second person's preference profile;
determining, based on the second person's preference profile, whether the second person is also expected to like the identified consumable item; and
if so, generating a recommendation that both persons try the identified consumable item.

14. The method of claim 1, further comprising:
receiving identifying information for a consumable item of interest;
retrieving, from the database, one or more values of characteristics for the consumable item of interest;

processing the retrieved values with the preference profile to determine a predicted rating for the consumable item of interest; and causing the user interface to output the predicted rating to the person.

15. The method of claim 1, further comprising:

receiving a request for a recommendation of a consumable item, wherein the request comprises a pairing criterion;

retrieving from the database one or more consumable items that have characteristics that satisfy the pairing criterion;

selecting one or more of the retrieved items having characteristics that, based on the person's preference profile, the person is expected to like; and causing the user interface to present a recommendation of the one or more selected consumable items to the person.

16. A method of assessing a person's personal taste, comprising, by one or more processors:

receiving a rating set comprising the person's ratings for a plurality of rated consumable item, wherein at least a portion of the received ratings comprise item ratings rather than ratings of item characteristics; and by one or more processors, developing a preference model for the person based on the received ratings by:

accessing a database comprising values of characteristics for a plurality of candidate consumable items, identifying the candidate consumable items in the database that correspond to the rated consumable items, retrieving, from the database, a value for at least one characteristic for each of the candidate consumable items that corresponds to characteristics of the rated consumable items, identifying at least one pattern of dependency between at least one of the retrieved characteristic values and at least one of the received item ratings, determining the preference model, based on the at least one pattern of dependency, and using the received item ratings and the values of characteristics for the candidate consumable items in the database that correspond to the rated consumable items to determine the preference model.

17. The method of claim 16, further comprising, by the one or more processors:

receiving a request for a recommendation of a consumable item, wherein the request comprises one or more criteria that the recommendation must satisfy;

accessing a database comprising characteristic values for a plurality of candidate consumable items and, based on the one or more criteria, the preference model and the characteristic values; and selecting from the database a candidate item for the recommendation.

18. The method of claim 16, wherein identifying at least one of the patterns of dependency comprises one or more of the following:

identifying a focal contrasting pattern associated with a group of the rated consumable items by analyzing relative differences in ratings for the group of rated consumable items as a function of the group of consumable items' traits by determining that the person's ratings for the group of rated consumable items include a focal point of positive or negative appeal;

identifying a polarizing preference pattern for which the person has expressed different patterns of rating for one or more trait values;

identifying a trending trait for which there is a non-reversing upward or a non-reversing downward trend in rating values as a function of the trait values; or identifying a consistent trait for which the person's ratings exhibit a degree of dispersion such as that they are effectively constant.

19. The method of claim 16, further comprising, by the one or more processors:

accessing the database to identify at least one candidate consumable item that exhibits one or more characteristics that, if the identified candidate consumable item is rated by the person, will improve the preference model or a preference profile for the person; and generating a suggestion that the person rate the identified candidate consumable item.

20. The method of claim 16, further comprising, by the one or more processors:

receiving identifying information for a consumable item of interest;

retrieving, from the database, one or more values of characteristics for the consumable item of interest;

processing the retrieved values with the preference profile to determine a predicted rating for the consumable item of interest; and outputting the predicted rating to the person.

* * * * *